United States Patent
Taylor et al.

(10) Patent No.: US 9,814,928 B2
(45) Date of Patent: Nov. 14, 2017

(54) ARCUATE MOTION APPARATUS AND METHOD

(71) Applicants: Jon Taylor, Waterloo (CA); Sanjeev Bedi, Waterloo (CA)

(72) Inventors: Jon Taylor, Waterloo (CA); Sanjeev Bedi, Waterloo (CA)

(*) Notice: Subject to any disclaimer, the term of this patent is extended or adjusted under 35 U.S.C. 154(b) by 0 days.

(21) Appl. No.: 14/640,696

(22) Filed: Mar. 6, 2015

(65) Prior Publication Data
US 2016/0243396 A1    Aug. 25, 2016

Related U.S. Application Data

(60) Provisional application No. 61/952,860, filed on Mar. 13, 2014.

(51) Int. Cl.
*A63B 69/00* (2006.01)
*A63B 69/38* (2006.01)
(Continued)

(52) U.S. Cl.
CPC .......... *A63B 21/4049* (2015.10); *A63B 15/00* (2013.01); *A63B 21/0058* (2013.01); *A63B 21/16* (2013.01); *A63B 21/4035* (2015.10); *A63B 21/4045* (2015.10); *A63B 23/12* (2013.01); *A63B 24/0087* (2013.01); *A63B 71/023* (2013.01); *G08C 17/02* (2013.01); *G09B 19/0038* (2013.01); *H04Q 9/00* (2013.01); *A63B 21/005* (2013.01); *A63B 21/0051* (2013.01);
(Continued)

(58) Field of Classification Search
CPC ................ A63B 69/0002; A63B 69/38; A63B 2069/0008; A63B 69/0095; A63B 69/365; A63B 69/3676; A63B 69/3641; A63B 2069/0006
USPC ....... 473/422, 451, 453, 455, 459, 258, 229, 473/259, 257; 482/99, 130, 102, 103, 482/138, 92
See application file for complete search history.

(56) References Cited

U.S. PATENT DOCUMENTS 2,084,901 A * 6/1937 Eisenberg .......... A63B 69/3676
                                                         473/229
2,985,452 A * 5/1961 Trippet .............. A63B 69/0002
                                                         473/453
(Continued)

*Primary Examiner* — Mitra Aryanpour
(74) *Attorney, Agent, or Firm* — Kenneth L. Bousfield; Bereskin & Parr LLP/S.E.N.C.R.L., s.r.l.

(57) ABSTRACT

A training or exercise apparatus may have a base and an adjacent movable armature or frame that carries a riding member, or shuttle, or carrier. The carrier has an engagement interface with an element of sporting or exercise equipment. The sporting or exercise equipment is engaged by the user, typically by being grasped. The apparatus defines a physical or virtual schedule describing an arc for a swing in the particular activity. The apparatus may include a manual or electronic means of imposing resistance to the motion. This resistance may be adjustable, and may be programmable as a function of one or both of position and speed. The apparatus may include an array of sensors such as may be used to determine the pre-existing stroke, and such as may be monitored during training to assess progress. The apparatus may be operated passively, or it may be operated interactively in a manner in which real-time feedback causes the apparatus to adjust resistance to the motion.

22 Claims, 25 Drawing Sheets

(51) Int. Cl.

| | | |
|---|---|---|
| *A63B 53/06* | (2015.01) | |
| *A63B 21/00* | (2006.01) | |
| *A63B 23/12* | (2006.01) | |
| *A63B 71/02* | (2006.01) | |
| *A63B 15/00* | (2006.01) | |
| *A63B 21/16* | (2006.01) | |
| *A63B 24/00* | (2006.01) | |
| *G09B 19/00* | (2006.01) | |
| *G08C 17/02* | (2006.01) | |
| *H04Q 9/00* | (2006.01) | |
| *A63B 69/06* | (2006.01) | |
| *A63B 69/10* | (2006.01) | |
| *A63B 69/36* | (2006.01) | |
| *A63B 71/14* | (2006.01) | |
| *A63B 102/16* | (2015.01) | |
| *A63B 102/14* | (2015.01) | |
| *A63B 102/04* | (2015.01) | |
| *A63B 71/06* | (2006.01) | |
| *A63B 21/005* | (2006.01) | |
| *A63B 21/012* | (2006.01) | |
| *A63B 21/02* | (2006.01) | |
| *A63B 22/00* | (2006.01) | |
| *A63B 22/02* | (2006.01) | |
| *A63B 23/14* | (2006.01) | |
| *G06Q 10/06* | (2012.01) | |
| *A63B 23/00* | (2006.01) | |
| *A63B 71/00* | (2006.01) | |
| *A63B 21/062* | (2006.01) | |

(52) U.S. Cl.
CPC ....... *A63B 21/00192* (2013.01); *A63B 21/012* (2013.01); *A63B 21/023* (2013.01); *A63B 21/0628* (2015.10); *A63B 21/151* (2013.01); *A63B 21/1681* (2013.01); *A63B 21/4007* (2015.10); *A63B 21/4015* (2015.10); *A63B 21/4019* (2015.10); *A63B 21/4034* (2015.10); *A63B 22/0087* (2013.01); *A63B 22/02* (2013.01); *A63B 23/1209* (2013.01); *A63B 23/14* (2013.01); *A63B 69/002* (2013.01); *A63B 69/0015* (2013.01); *A63B 69/0017* (2013.01); *A63B 69/0024* (2013.01); *A63B 69/0026* (2013.01); *A63B 69/0046* (2013.01); *A63B 69/0071* (2013.01); *A63B 69/0095* (2013.01); *A63B 69/06* (2013.01); *A63B 69/10* (2013.01); *A63B 69/3644* (2013.01); *A63B 69/38* (2013.01); *A63B 71/0622* (2013.01); *A63B 71/141* (2013.01); *A63B 2023/006* (2013.01); *A63B 2024/0068* (2013.01); *A63B 2024/0093* (2013.01); *A63B 2069/0008* (2013.01); *A63B 2071/0081* (2013.01); *A63B 2071/027* (2013.01); *A63B 2071/065* (2013.01); *A63B 2071/068* (2013.01); *A63B 2071/0683* (2013.01); *A63B 2102/04* (2015.10); *A63B 2102/14* (2015.10); *A63B 2102/16* (2015.10); *A63B 2208/0204* (2013.01); *A63B 2208/0228* (2013.01); *A63B 2208/0233* (2013.01); *A63B 2220/16* (2013.01); *A63B 2220/34* (2013.01); *A63B 2220/51* (2013.01); *A63B 2220/805* (2013.01); *A63B 2220/806* (2013.01); *A63B 2220/807* (2013.01); *A63B 2225/02* (2013.01); *A63B 2225/09* (2013.01); *A63B 2225/093* (2013.01); *A63B 2225/20* (2013.01); *A63B 2225/50* (2013.01); *A63B 2243/007* (2013.01); *A63B 2243/0066* (2013.01); *A63B 2244/15* (2013.01); *A63B 2244/16* (2013.01); *G06Q 10/0639* (2013.01); *G08C 2201/93* (2013.01); *H04Q 2209/40* (2013.01)

(56) References Cited

U.S. PATENT DOCUMENTS

| | | | | |
|---|---|---|---|---|
| 3,339,927 | A * | 9/1967 | Nunn | A63B 69/3644 473/258 |
| 3,341,208 | A * | 9/1967 | Marcella | A63B 69/3644 473/259 |
| 3,604,712 | A * | 9/1971 | Prior | A63B 24/0003 473/229 |
| 4,347,993 | A | 9/1982 | Leonard | |
| 4,408,183 | A | 10/1983 | Wills | |
| 5,151,070 | A * | 9/1992 | Norman | A63B 21/06 473/229 |
| 5,156,402 | A | 10/1992 | Hart | |
| 5,308,074 | A | 5/1994 | Dorotinsky et al. | |
| 5,318,488 | A * | 6/1994 | Babcock | A63B 22/16 482/51 |
| 5,322,276 | A * | 6/1994 | Hardison, Jr. | A63B 69/3644 473/417 |
| 5,423,548 | A * | 6/1995 | Bricker | A63B 69/3641 473/258 |
| 5,429,367 | A * | 7/1995 | Amos | A63B 69/3644 473/259 |
| 5,439,225 | A * | 8/1995 | Gvoich | A63B 21/00069 473/223 |
| 5,441,255 | A * | 8/1995 | Verbick | A63B 23/03508 473/422 |
| 5,595,545 | A * | 1/1997 | O'Brien | A63B 69/3644 473/259 |
| 5,816,932 | A * | 10/1998 | Alexander | A63B 69/3644 473/259 |
| 5,895,327 | A * | 4/1999 | Francisco | A63B 69/3644 473/229 |
| 5,984,798 | A * | 11/1999 | Gilmour | A63B 69/3644 473/221 |
| 6,165,110 | A * | 12/2000 | Gajda | A63B 21/06 482/102 |
| 6,186,910 | B1 * | 2/2001 | Kobayashi | A63B 22/14 473/230 |
| 6,402,632 | B2 | 6/2002 | Hope et al. | |
| 6,582,319 | B2 * | 6/2003 | Czaja | A63B 69/3641 473/257 |
| 6,645,094 | B2 | 11/2003 | Obidiegwu | |
| 6,685,600 | B1 * | 2/2004 | Ullman | A63B 21/156 482/100 |
| 6,705,976 | B1 * | 3/2004 | Piane, Jr. | A63B 21/154 482/102 |
| 7,056,224 | B1 * | 6/2006 | Keyes | A63B 69/3641 473/229 |
| 7,074,133 | B1 * | 7/2006 | Jones | A63B 69/3641 473/226 |
| 7,150,682 | B2 | 12/2006 | Varner | |
| 7,217,202 | B2 * | 5/2007 | Troxell | A63B 69/0002 473/422 |
| 7,517,290 | B1 * | 4/2009 | Springer | A63B 69/0002 473/422 |
| 7,625,320 | B2 | 12/2009 | Wehrell | |
| 7,806,780 | B1 * | 10/2010 | Plunkett | A63B 69/3641 473/229 |
| 7,874,931 | B2 * | 1/2011 | Liao | A63B 69/3641 473/257 |
| 7,887,471 | B2 * | 2/2011 | McSorley | A63B 21/0552 482/136 |
| 7,981,000 | B2 | 7/2011 | Watterson et al. | |
| 8,142,305 | B2 | 3/2012 | Hackenberg | |
| 8,246,524 | B2 * | 8/2012 | Castillo | A63B 21/023 482/101 |
| 8,292,761 | B2 * | 10/2012 | Krawczyk | A63B 69/0002 473/430 |
| 8,715,098 | B2 * | 5/2014 | Napolitano | A63B 69/3644 473/257 |

(56) References Cited

U.S. PATENT DOCUMENTS

| | | | | |
|---|---|---|---|---|
| 9,227,130 B1* | 1/2016 | Burdick | ............... | A63B 69/385 |
| | | | | 473/459 |
| 9,339,709 B2* | 5/2016 | Lagier | ................... | A63B 69/00 |
| | | | | 473/453 |
| 9,399,163 B2* | 7/2016 | Laster | ................ | A63B 69/3641 |
| | | | | 473/266 |
| 2012/0309554 A1 | 12/2012 | Gibbs et al. | | |
| 2013/0012340 A1 | 1/2013 | Kanner et al. | | |

* cited by examiner

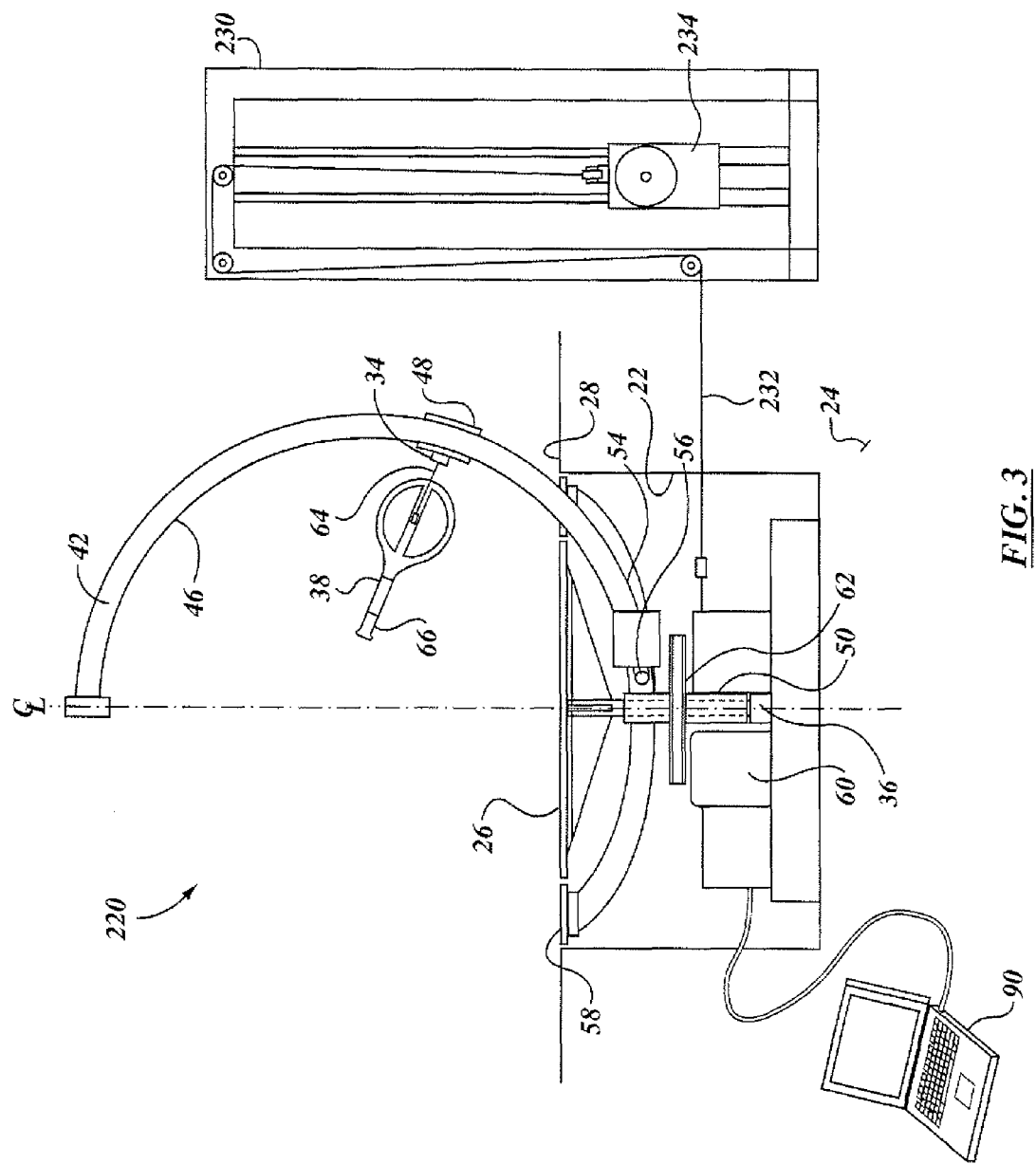

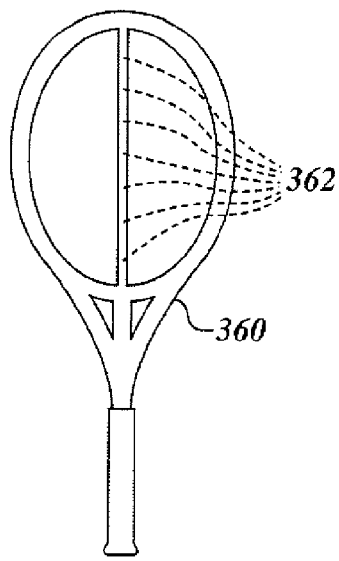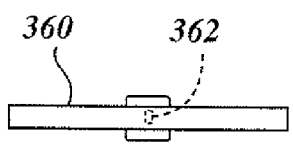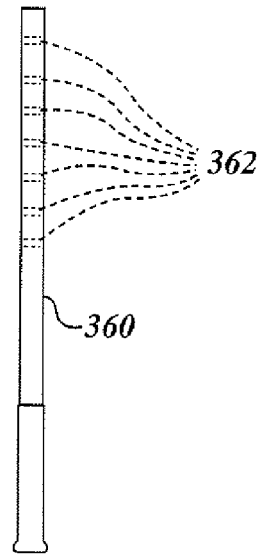
FIG. 11a  FIG. 11c  FIG. 11b
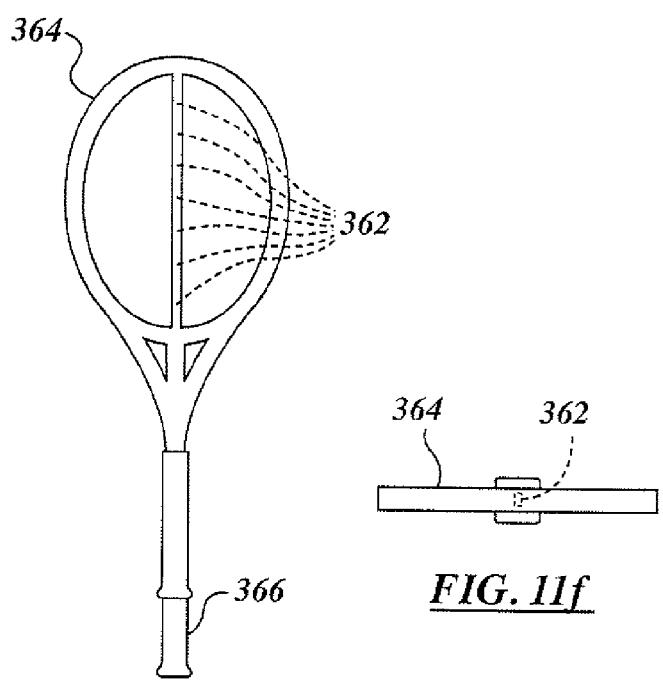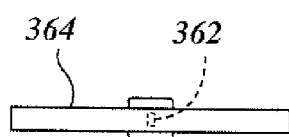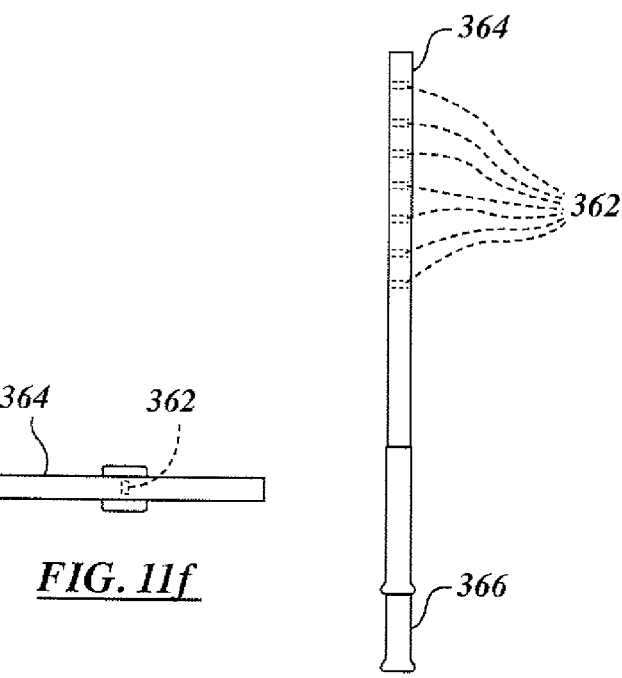
FIG. 11d  FIG. 11f  FIG. 11e

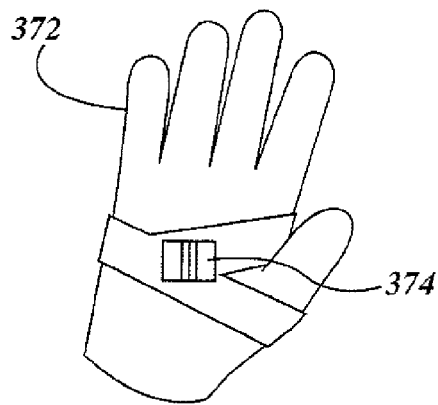
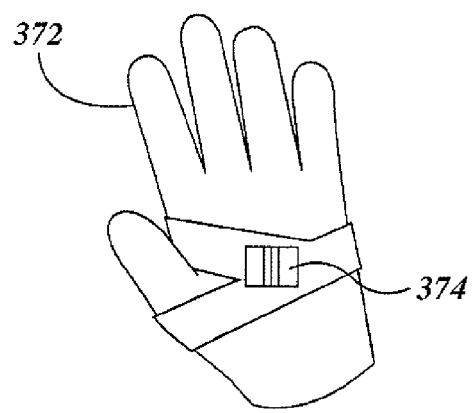
*FIG. 13a*  *FIG. 13b*
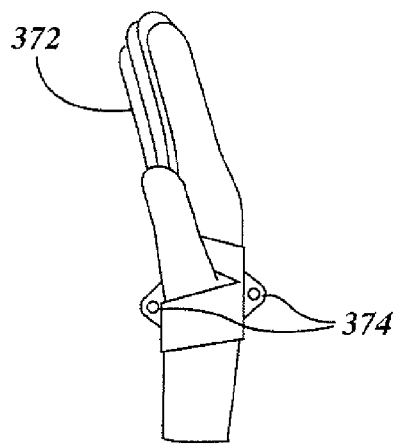
*FIG. 13c*

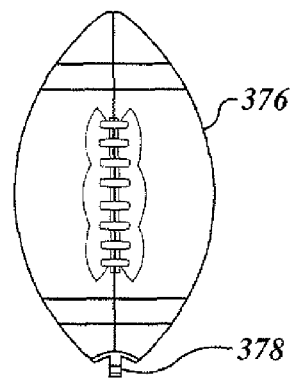
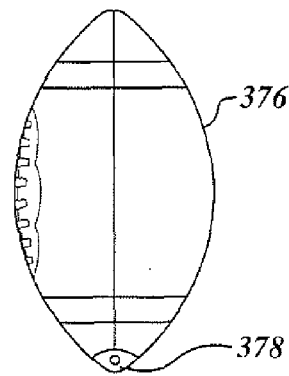
FIG. 14a    FIG. 14b
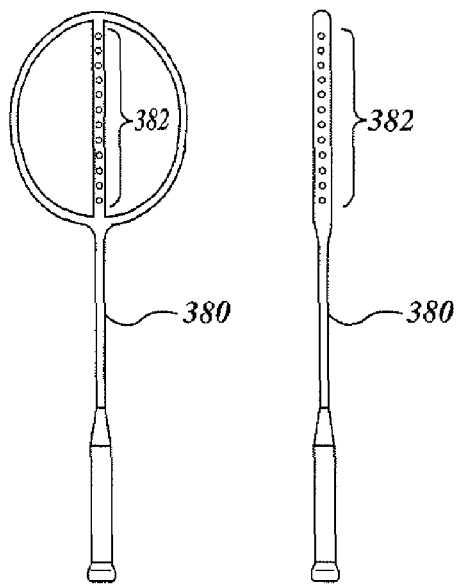
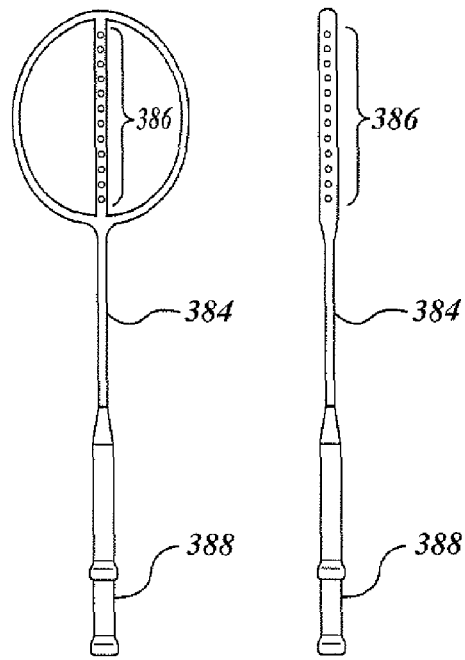
FIG. 15a    FIG. 15b    FIG. 15c    FIG. 15d

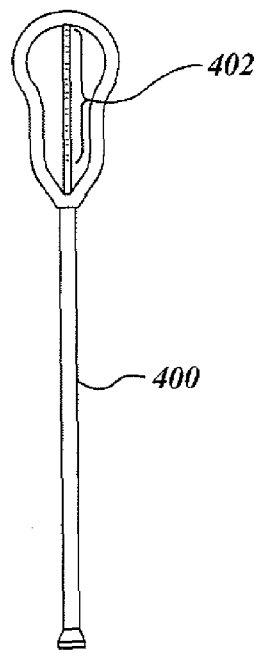
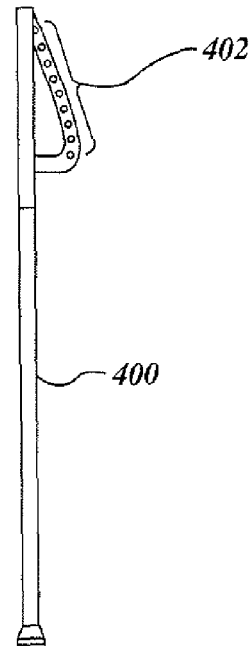
*FIG. 18a*  *FIG. 18b*
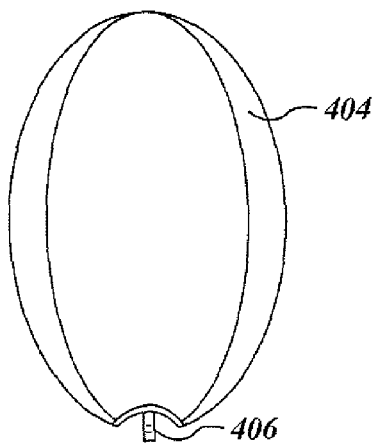
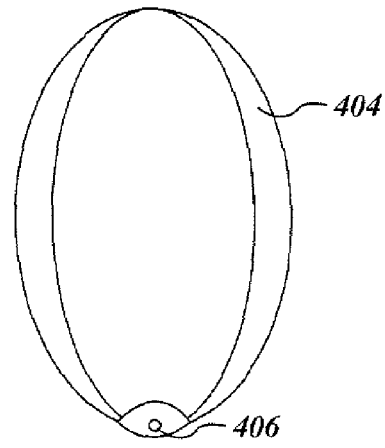
*FIG. 19a*  *FIG. 19b*

ARCUATE MOTION APPARATUS AND METHOD

FIELD OF INVENTION

This description relates to an arcuate motion apparatus and method of operation of that apparatus.

BACKGROUND OF THE INVENTION

There are many contexts in which a person may wish to make a swinging motion. For one reason or another, a person may wish to practice, or alter, or improve that motion, whether as a matter of training for a sporting activity, or as exercise.

Exemplary athletes in sports such as tennis, baseball and ice hockey, to swing their respective piece(s) of equipment along a perfectly circular arc. The equipment begins its trajectory from behind the body and travels a circular arc all the way around the body to a finishing point. To acquire a masterful swing, the athlete must spend countless hours on the playing surface, and train away from the playing surface. For example, in tennis, the on-court time comprises of shot-making repetitions and other activities, such as picking up balls, resting, waiting for ball to return from the opponents' side etc. Even when one receives private lessons in tennis, a significant amount of time is spent picking up balls and other activities. Whereas when one exercises in a gym facility, he or she can perform concentrated exercises. However, most gym facility equipment is designed for linear motion (ex. bar bells, dumbbells, squat bars, etc.). What athletes need is an apparatus that allows them to swing their piece(s) of sport equipment in a gym-type environment without the wasteful activities like picking up balls or waiting for balls to be returned from opponents. This concentrated training can be done without having to book a court or schedule a time with an opponent. The issues listed above are addressed by this invention.

As shown above, mastering a sport swing requires swinging a particular piece of sport equipment through a curved arc. To excel at such swings, one must train the body's muscles to coordinate this kinematic motion. There does not exist an exercise training apparatus that allows an athlete or sportsman to train their muscles to guide the sport equipment trajectory though a curved arc repeatedly and reliably. The current invention addresses this need.

There have been a variety of swing exercise trainers produced in the past. For example, Californian fitness company, Fitness Anywhere LLC, has recently released a product called the TRX Rip Trainer. To use this product, the user connects one end of a resistance band to an anchoring mechanism and the other to approximately a one-meter long rigid shaft. One can then practice swinging this shaft with elastic-like resistance. This product works the core (and possibly other) muscles during a rotary swinging motion. However, it only provides one type of resistance that is not uniform and not programmable. In contrast, most swings, whether they are in tennis, hockey or baseball, require different forces along the swing trajectory. With the TRX product, one could be performing a different motion each time, which would take away from any consistency that the user aims to establish by using the product. Additionally, a person may be swinging the shaft incorrectly, reinforcing bad habits like poor form. Another limitation of the Rip Trainer is that the resistance band will likely contact the person as he or she makes the swing, which may be an annoyance. The Rip Trainer also has only one simple shaft; a shaft that is like certain pieces of sport equipment but not identical to them. If one is after reinforcing a habit of swinging in a circular planar path, then one wants to train with a specific apparatus such as a racquet/hockey stick/baseball bat that has as few modifications as possible. The best players practice like they play.

Fitness products that focus on circular motion do exist and are popular among a significant amount of people. For example, a company called Gytrotonic has a product called the Pulley Tower. This product allows users to work their shoulder joints in a fluid circular motion, increasing strength, balance and range of motion. It is very popular and there are a number of workout programs that one can implement when using this company's products. This equipment is focused on exercise regimens but cannot be used for reinforcing a habit of swinging in a circular planar path. Furthermore, the Pulley Tower is limited in the variety of circular motions/exercises that it offers and cannot be used for swing training.

U.S. Pat. No. 6,186,910 describes a swing-training machine. It consists of a vertical arm that rotates around a stand with a rider that moves along the arm. The rider is connected lo this apparatus via a tether that attached to a sport handle. This machine is limited in that it does not consist of a circular track, and the users of this machine are only able to perform circular motion exercises in or near the horizontal circular trajectory, is not designed for exercise regimens aimed at developing the core and specific muscle groups that require motions in the near-vertical plane. In addition, exercise regimens that require the simultaneous training of left and right halves of the body cannot be accommodated on this machine.

There have been a variety of core-activating, twisting and swinging machines that are available online and at general sports clubs, etc. Some golf swing trainers possess circular guide rails that promote twisting and circular motion of the body. These apparatus are limited in that they do not offer programmable resistances along the swing path. The set circle diameter on these swing-training machines is also limits these apparatus to very few pieces of sport or activity equipment to be used; golf trainers only work with golf clubs. These apparatus do not accommodate equipment length variations, and, for example, cannot be used for tennis training.

Many swing training machines and methods used in the past have been flawed in other ways. For example, the weight attachments that baseball players connect to their bats while they warm up in an on-deck circle may produce excess and unnecessary downward force to be placed on the barrel of the bat a force that is not present during a normal swing. A machine that does not have a downward pull during the swing is required.

Several single and dual-cable machines that exist on the market today are limited in the range of motion due to the length of cable. In addition the user may get tangled up with the wire during an exercise, which can be very uncomfortable or painful, or both. An apparatus is needed that allows the user to work in a full range of motion without the cable hitting the user during use.

SUMMARY OF INVENTION

The following summary may introduce the reader to the more detailed discussion to follow. The summary is not intended to, and does not, limit or define the claims.

In an aspect of the invention there is an arcuate motion apparatus. It has a carrier and a movable member. The movable member is mounted to the carrier. The movable member having a tool engagement interface. The apparatus has an arcuate motion schedule. The motion member is constrained to move according to the arcuate motion schedule.

In a feature of that aspect of the invention the tool engagement interface is an accommodation defining one of (a) a female socket for receiving a corresponding male object; and (b) a male socket for receiving a corresponding female object. In another feature, the carrier has a drive, and the drive is operable to encourage motion of the movable member according to the schedule. In another feature, the schedule includes a mechanical guide and the movable member is constrained to follow the guide. In still another feature, the schedule constrains the movable member to a single degree of freedom of motion. In still another feature, the schedule is adjustable. In a further feature, the schedule includes a substantially circular trackway. In an additional further feature, the trackway has an angular adjustment by which to incline the trackway relative to the horizontal.

In still another feature, the carrier includes a first armature and a second armature. The first armature has a first rotational degree of freedom relative to a stationary datum. The second armature has a second rotational degree of freedom relative to the first armature. The second degree of freedom is perpendicular to the first degree of freedom. The movable member is mounted to the second armature, whereby the movable member has first and second rotational degrees of freedom relative to the stationary datum. In a further feature, the second armature is substantially circular. In still yet another feature, the apparatus includes a drive mounted to govern motion of the movable member along the second armature. In again another feature, the movable member is secured at a fixed location on the second armature, and the first and second armatures are driven to govern motion of the movable member according to the schedule. In a still further feature the schedule is a virtual schedule, and the apparatus is programmed to drive motion of the movable member according to the schedule.

In another feature, the apparatus includes sensing equipment operable to track motion of the movable member. In a further feature, the movable member is governed by a drive, and the drive is force-limited. In again another feature, the movable member is driven to follow the schedule, and the movable member has feedback in respect of at least one of (a) position; (b) velocity; and (c) force. In still yet another feature, the apparatus has (a) a non-load sensing capability; (b) an end condition arcuate motion objective; and a comparator operable to determine the difference between (a) and (b). In still again another feature, the apparatus is programmed to interpolate between (a) and (b) to define partial regime adjustment steps, and to modify operation of the movable member along the schedule according to the adjustment steps. In another feature, the movable member is radially adjustable. In again another feature, the apparatus includes a stationary base, and the apparatus has an origin of motion having an adjustable position relative to the stationary base.

BRIEF DESCRIPTION OF THE ILLUSTRATIONS

These and other features and aspects of the invention may be explained and understood with the aid of the accompanying illustrations, in which:

FIG. 1b is a side view of the apparatus of FIG. 1a;

FIG. 1c is a perspective top view of the apparatus of FIG. 1a;

FIG. 2b is a side view of the apparatus of FIG. 2a;

FIG. 2c is a perspective top view of the apparatus of FIG. 2a;

FIG. 3 is a front view of an alternate embodiment of apparatus to that of FIG. 1a, with an added weight machine;

FIG. 10a is front view of a left-handed hockey stick for use with the apparatus of FIG. 1a;

FIG. 10b is a left hand view of the left-handed hockey stick of FIG. 10a;

FIG. 10c is a right hand view of the left-handed hockey stick of FIG. 10a;

FIG. 11a is a front view of a tennis racquet for use with the apparatus of FIG. 1a;

FIG. 11b is a right hand view of the tennis racquet of FIG. 11a;

FIG. 11c is a top view of the tennis racquet of FIG. 11a;

FIG. 11d is a front view of an alternate tennis racquet to that of FIG. 11a;

FIG. 11e is a right hand view of the tennis racquet of FIG. 11d;

FIG. 11f is a top view of the tennis racquet of FIG. 11d;

FIG. 12a is a front view of a baseball bat for use with the apparatus of FIG. 1a;

FIG. 12b is a right-hand view of the baseball bat of FIG. 1a;

FIG. 12c is a rear view of the baseball bat of FIG. 12a;

FIG. 13a is a plantar (palm) view of an hand strap sport or exercise equipment for use with the apparatus of FIG. 1a;

FIG. 13b is a dorsal (back of hand) view of the hand strap of FIG. 13a;

FIG. 13c is a left hand view of the hand strap of FIG. 13a;

FIG. 14a is a front view of a football for use with the apparatus of FIG. 1a;

FIG. 14b is a right hand view of the football of FIG. 14a;

FIG. 15a is a front view of a badminton racquet embodiment of the sport or activity equipment;

FIG. 15b is a right hand view of a badminton racquet embodiment of the sport or activity equipment;

FIG. 15c is a front view of a modified badminton racquet embodiment of the sport or activity equipment;

Figure 16A:
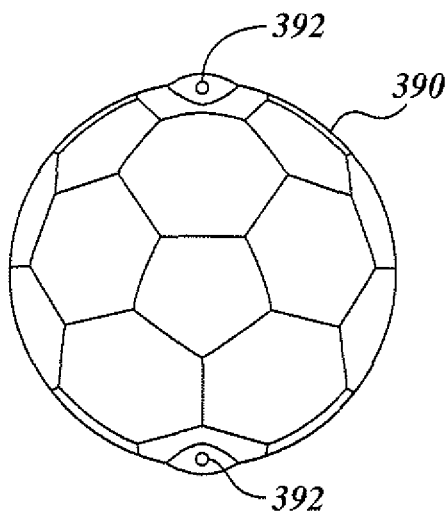
Figure 16B:
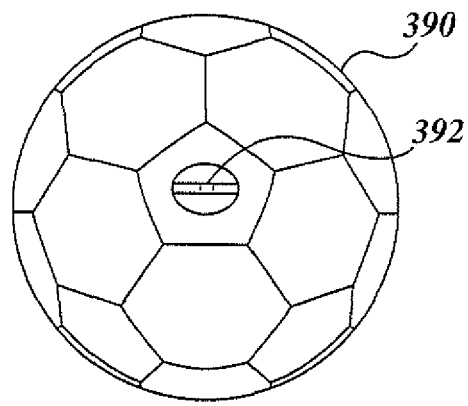

FIG. 15*d* is a right hand view of a modified badminton racquet embodiment of the sport or activity equipment;

FIG. 16*a* is a front view of a soccer ball embodiment of the sport or activity equipment;

FIG. 16*b* is a top view of a soccer ball embodiment of the sport or activity equipment.

Figure 17A:
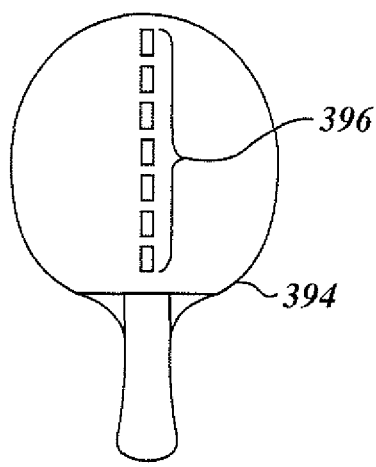
Figure 17B:
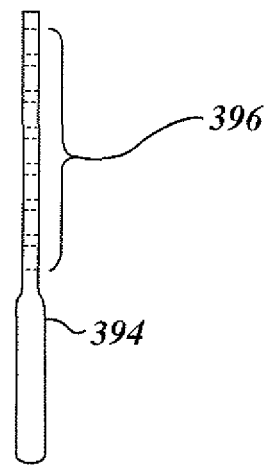
Figure 20A:
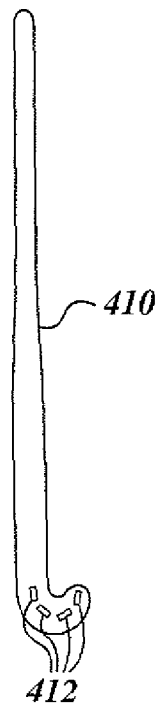
Figure 20B:
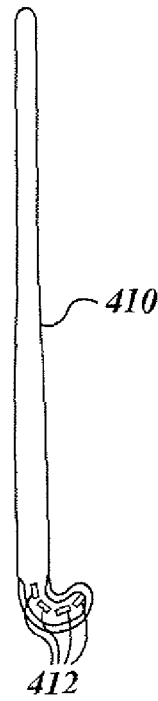
Figure 21A:
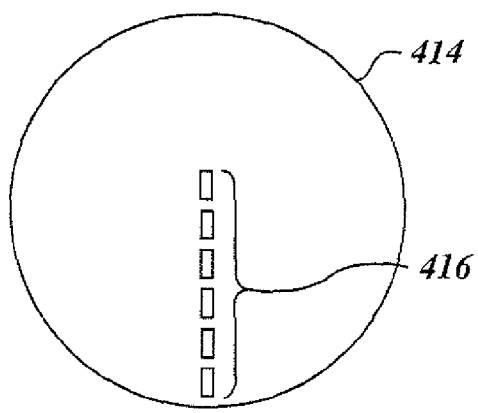
Figure 21B:
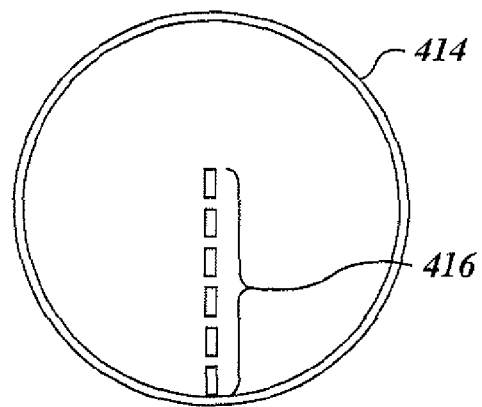
Figures 22, 23A, 23B:
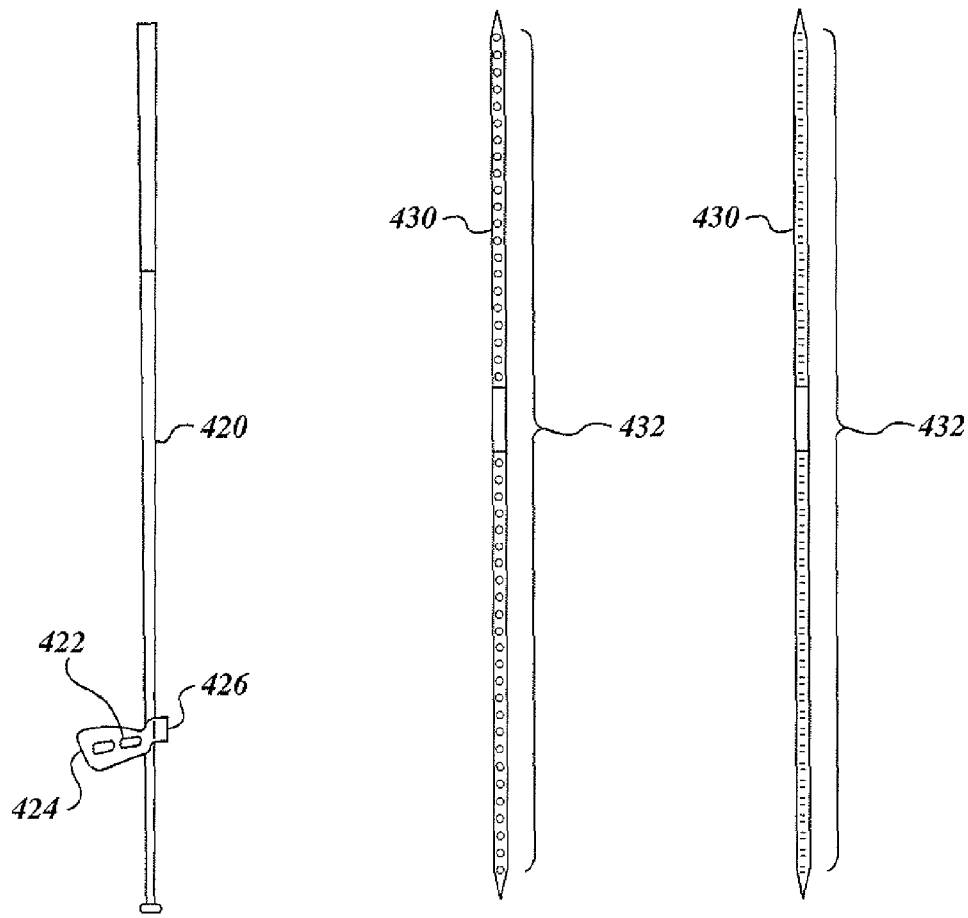
Figure 24:
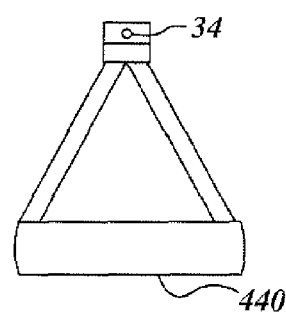

FIG. 17*a* is a front view of a table tennis racquet embodiment of the sport or activity equipment;

FIG. 17*b* is a right hand view of a table tennis racquet embodiment of the sport or activity equipment;

FIG. 18*a* is a front view of a lacrosse stick embodiment of the sport or activity equipment;

FIG. 18*b* is a right hand view of a lacrosse stick embodiment of the sport or activity equipment;

FIG. 19*a* is a front view of a rugby ball embodiment of the sport or activity equipment;

FIG. 19*b* is a right hand view of a rugby ball embodiment of the sport or activity equipment;

FIG. 20*a* is a front view of a field hockey stick embodiment of the sport or activity equipment;

FIG. 20*b* is a right hand view of a field hockey stick embodiment of the sport or activity equipment;

FIG. 21*a* is a top view of a Frisbee embodiment of the sport or activity equipment;

FIG. 21*b* is a bottom view of a Frisbee embodiment of the sport or activity equipment;

FIG. 22 is a front view of a golf club embodiment of the sport or activity equipment;

FIG. 23*a* is a front view of a javelin embodiment of the sport or activity equipment;

FIG. 23*b* is a right hand view of a javelin embodiment of the sport or activity equipment; and FIG. 24 is a front view of sport or activity equipment handle.

DETAILED DESCRIPTION

The description that follows, and the embodiments described therein, are provided by way of illustration of an example, or examples, of particular embodiments incorporating one or more of the principles, aspects and features of the present invention. These examples are provided for the purposes of explanation, and not of limitation, of those principles, aspects and features of the invention. In the description, like parts are marked throughout the specification and the drawings with the same respective reference numerals. The drawings may be taken as being to scale, or generally proportionate, unless indicated otherwise.

The scope of the invention herein is defined by the claims. Though the claims are supported by the description, they are not limited to any particular example or embodiment, and any claim may encompass processes or apparatus other than the specific examples described below. Other than as indicated in the claims themselves, the claims are not limited to apparatus or processes having all of the features of any one apparatus or process described below, or to features common to multiple or all of the apparatus described below. It is possible that an apparatus, feature, or process described below is not an embodiment of any claimed invention.

The terminology used in this specification is thought to be consistent with the customary and ordinary meanings of those terms as they would be understood by a person of ordinary skill in the art in North America.

This description discusses an arcuate motion apparatus. In that context, it may be helpful to make reference to either a spherical co-ordinate system or to a cylindrical polar co-ordinate system. The arcuate motion apparatus herein may tend to relate to motion of an element or elements of the human body that may be subject to treatment or training, whether in the nature of training to follow a particular arc in a swinging motion, or for the purpose of providing physiotherapy or other treatment associated with motion of a limb about a joint or socket; or of a bodily swinging motion generally where the body moves about an axis of rotation.

In the context of spherical motion, as about a shoulder or elbow, or wrist joint, for example, there may be a center of rotation, or origin, sometimes identified as "O". The radial direction, or axis, may take the origin as its datum, and may extend away therefrom. There may be a vertical or z-axis datum, such as may define a central pole, or axis of revolution. An angle of altitude (or, equivalently, latitude), may be measured from an equator, or horizontal plane, toward the vertical axis datum. The vertical axis may lie in a vertical reference plane. There may be a circumferential, or longitudinal, or horizontal, direction of angular displacement such as may be measured from a datum that lies in a vertical reference plane, and such as may define an azimuth angle. An item on a radius may then have its position defined by the radial distance from the origin, the angle from the horizontal, and an azimuth angle from the vertical datum plane. Angular velocities, accelerations, and forces can all be measured in these two angular directions, and translational displacements and velocities can be measured in the radial direction. Similarly, in some contexts it may be helpful to define a cylindrical co-ordinate system in which there is a vertical axis, or z-axis; a radial axis extending perpendicularly away from the vertical axis, and a circumferential direction mutually perpendicular to both the vertical and radial directions. The commonly used engineering terms "proud", "flush" and "shy" may be used herein to denote items that, respectively, protrude beyond an adjacent element, are level with an adjacent element, or do not extend as far as an adjacent element, the terms corresponding conceptually to the conditions of "greater than", "equal to" and "less than".

Figure 1A:
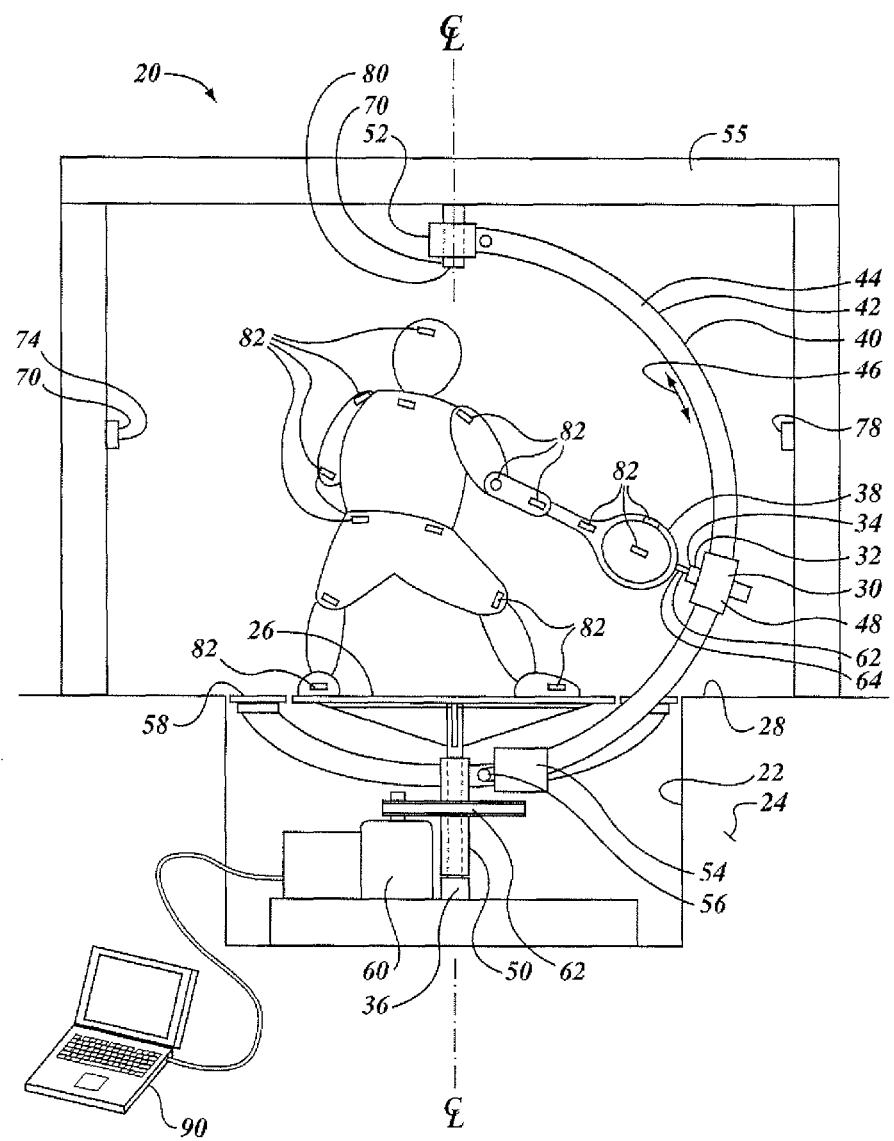
FIG. 1a shows a front view of an arcuate motion apparatus according to an aspect of the invention.
Figure 1B:
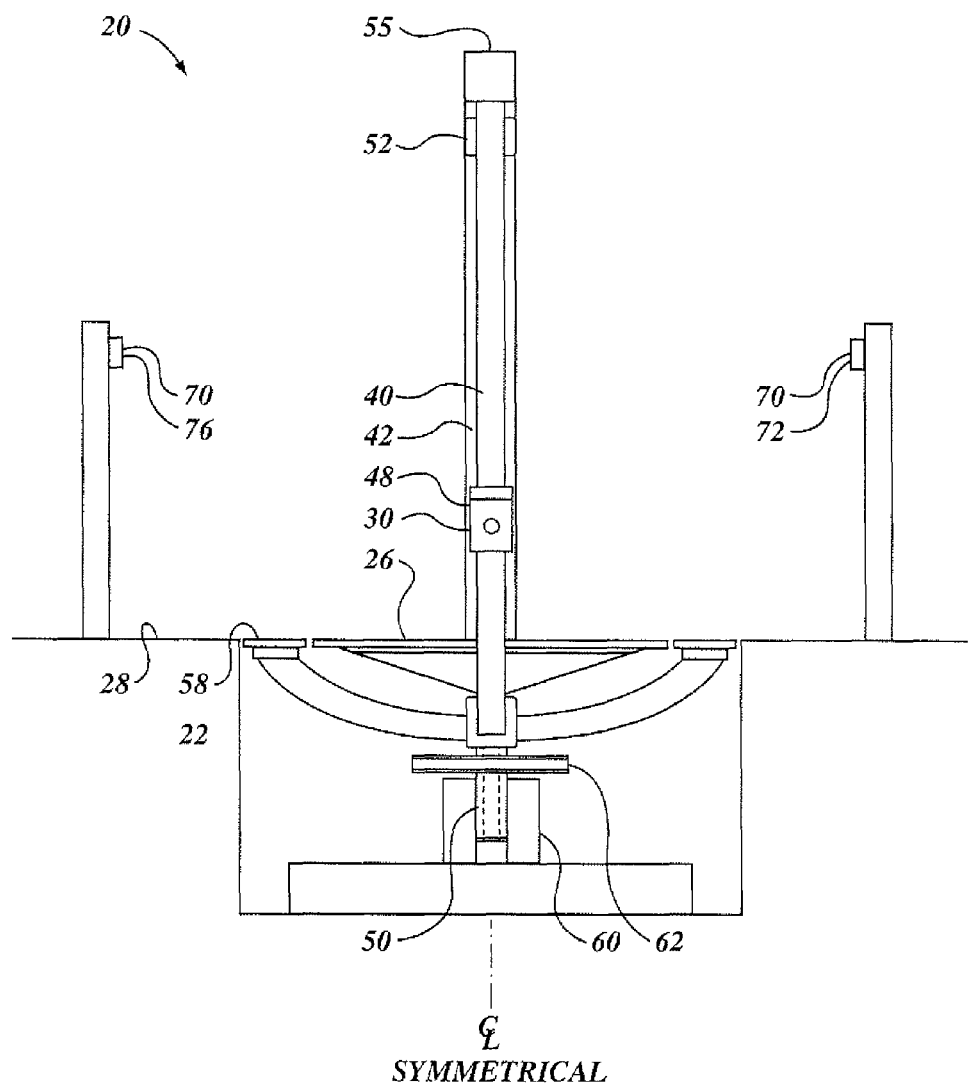
Figure 1C:
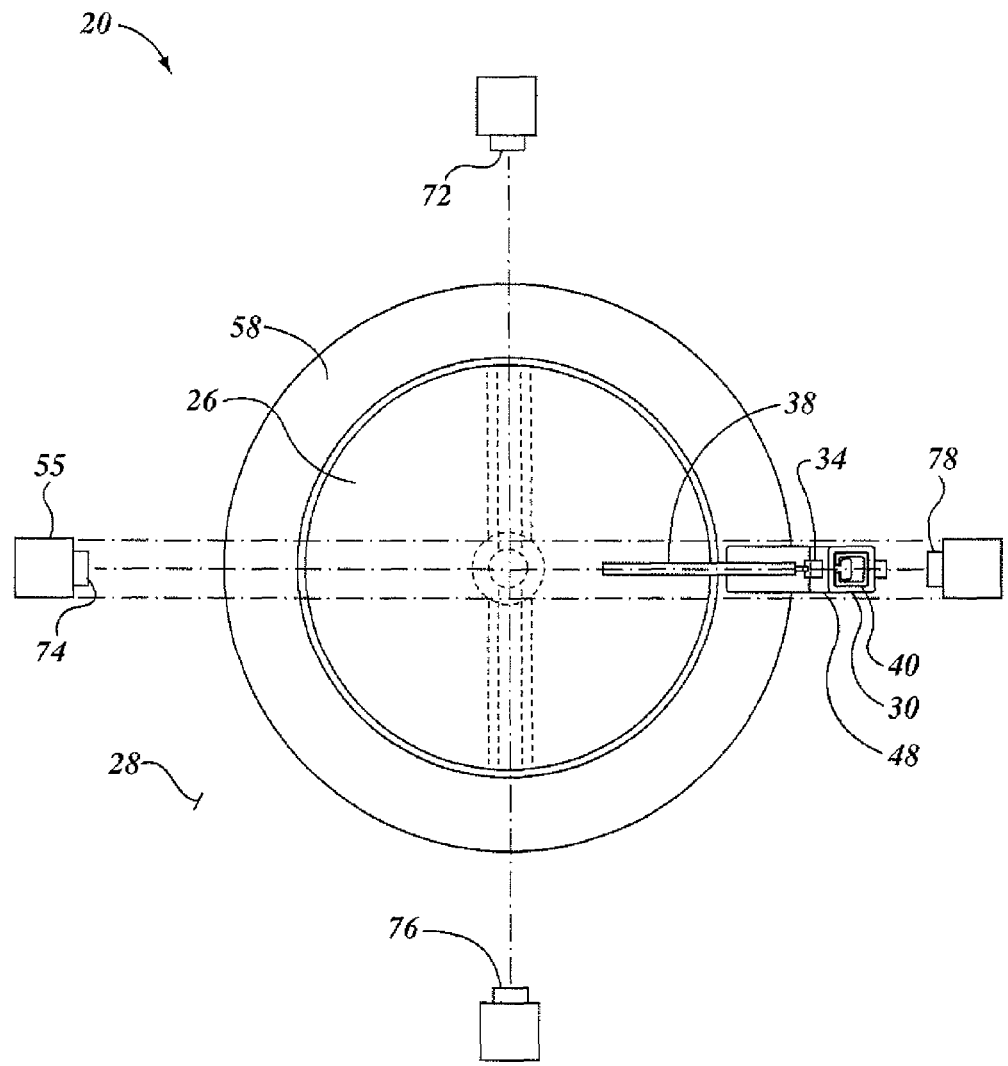

Considering FIGS. 1*a*, 1*b*, and 1*c*, an apparatus or assembly according to an aspect of the invention is indicated generally as 20.

Apparatus 20 may be mounted to, or in, a well 22 in a foundation, 24. Apparatus 20 may include a platform or pedestal, or stationary member or stationary datum, or base 26 upon which a user may be positioned, whether in a standing, sitting, or other position suitable for the type and range of motion contemplated. Base 26 may have a no-skid surface, and may be generally flush with the surrounding floor of the room, indicated generally as 28. In some instances base 26 may include a treadmill. In another embodiment it may include a seat or chair or saddle, as in the sliding seat of a rowing shell, the fixed thwart of a canoe, or the bench of a rowboat, a kayak, or a dory.

Apparatus 20 may include a moving member, or movable member, 30, such as may be used to describe, or sweep through, or move through, a desired arc of motion, or arcuate path. Member 30 may be thought of as, or be termed, a tool holder or a seat for a tool. Moving member 30 has a tool interface 32 that has an engagement assembly or engagement fitting, or accommodation, or mandrel, or clamp or socket, whether male or female, in such form as may be, and called by such name as may be, indicated as 34. Engagement fitting 34 may have a shape for engagement with a particular tool or apparatus. In many cases the tool or apparatus may be a piece of sporting equipment, or a handle portion of such sporting equipment, 38, such as a racket (be it for tennis, badminton, squash), a paddle such as for table tennis, a third degree lever or stick such as for hockey, lacrosse, baseball, cricket, or field hockey, or golf; or a throwing object such as a javelin, discus, football, hammer, basketball, bowl, or bowling ball, oars, sweeps, paddles, or other objects, or it may simply be a hand-grip or foot hold, for direct engagement with the person's hand or foot, as may be.

Apparatus 20 may be operable to accommodate motion of moving member in a motion having a path lying in a body of revolution, that path, or that body of revolution having an origin of motion, or a center of rotation, however it may be termed. Inasmuch as not all people are of the same size, the height of that center of revolution may be adjusted relative to the height of base 26, such as by a mechanism such as a jack or adjustable acme screw, or other means, indicated generically as 36. The device may be manually operated, as by a crank, or it may be operated automatically as by an electric motor. It permits base 26 to be raised or lowered relative to the center of motion of apparatus 20, and, also, relative to the foundation. The height for a particular user may be recorded, such that the apparatus may be programmed to adjust to the stored parameters for that user at a later date.

Moving member 30 is supported on, or by, a carrier or carrier assembly, indicated generally as 40. The carrier assembly supports moving member 30 through its range of motion. A first embodiment of carrier assembly 40 may include a first member 42, which may be termed an armature, and may have the form of a frame or arm 44, as indicated. That frame or arm may define a path, or track, or guide, or guideway 46 to which movable member 30 is engaged in a manner such as may limit the degrees of freedom of motion of movable member 30. For example, movable member 30 may include an engagement fitting such as may have the form of a car or spider, or truck, or slider, or sleeve 48 that fits on in mating engagement with guideway 46, such that sleeve 48 may also be termed a slave or a follower. In this example sleeve 48 is restricted to a single degree of freedom of motion, namely displacement along the arc or path defined by guideway 46. Guideway 46 may be formed on a circular arc such that the degree of freedom of motion of movable member 30 relative to first member 42 is motion in the circumferential direction of the curve. This degree of freedom may also be expressed as a first degree of rotational freedom of motion in the latitudinal direction in a spherical frame of reference, at a constant radius defined by the radius of the bow, i.e., first member 42. It follows that to the extent that first member 42 is capable of rotating about a vertical, or z-axis, movable member 30 also has a second degree of freedom of motion (i.e., rotational motion in the longitudinal or azimuth angular direction about the polar or z-axis), and may therefore follow a path passing through any point on the spherical range of motion to which it is constrained.

First member 42 may be secured under base 26 in a bearing or bushing or socket 50 and may have a stub shaft extending in the vertical direction for that purpose. In some embodiments that single bottom mounting may be sufficient. However, in other embodiments it may be helpful also to secure first member 42 at a second location, namely at an upward securement or fitting or socket 52 that may, again, receive a stub shaft in bearings or a bushing such as may permit rotational motion of first member 42 about the vertical axis. The upper securement may be mounted or anchored to a roof or ceiling fitting, or apparatus 20 may include a stationary frame or truss structure 55 for this purpose.

Moving member 30 may include a motor 54 and drive transmission 56 such as may be used to cause moving member 30 to move up or down first member 42. In one example, motor 54 may be mounted near the base of first member 42 under base 26 and at little or no radial distance from the axis of rotation of first member 42 so as to have little rotational inertia as first member 42 moves rotationally. Transmission 56 may include a cable or chain, or timing belt drive, or equivalent. To the extent that first member 42 may have a channel cross-section, the cable or belt drive may be within the channel. The transmission may include a counterweight such as may be mounted within member 42 and such as may correspond to the weight of slider 48. Alternatively, moving member 30 may include wheels or gears that engage a pathway of first member 42, and may have an electric motor.

Apparatus 20 may include a radial adjustment, or radially adjustable member 62 of movable member 30. Radial adjustment may be helpful, for example, to adjust for a user of different size or arm length or reach. Radially adjustable member 62 may be a manually adjusted member, and thereafter locked in fixed position member, or it may be a dynamic member driven by a motor or other means as movable member 30 is being driven through the desired arc. Such a motor may be an electric motor mounted to slider 48, for example.

An annular shroud or cowling 58 may be mounted to ride within, and to cover, the annular gap between surrounding floor 28 and base 26. The shroud or cowling 58 may be an extension of base 26, and, as illustrated, may move rotationally about the z-axis when first member 42 moves about that axis, but may be stationary when the unit is not in use and a person is arriving at or departing from apparatus 20.

Angular motion of first member 42 about the z-axis may be driven by a motor 60 and transmission 62 such as may be mounted below base 28.

Apparatus 20 may include a schedule that defines the arcuate path to be followed. The schedule may be mechanical, in the form of a track and track follower, or it may be virtual, in the sense of being a series of co-ordinates defining points on an arc or similar curve, and drives that operate to move the tool seat 30 through that set of points, or that confine motion of the tool seat to pass through those points, or that encourage motion of the tool seat to pass through those points. A programmed schedule may correlate position, e.g., in terms of spherical or cylindrical coordinates on a path, or it may correlate position v. time—that is it may include both position and velocity.

As thus described, apparatus 20 has a moving bow, namely first member 42, that is held in pivoting mounts at top and bottom ends; and moving member 30 is a slider or car that moves along the bow. Both members may have drives, as indicated above, and those drives may be reactive to the motion of moving member 30 as it is moved by the user, to increase or decrease resistance, as may be as a function of either or both of position or velocity.

In one embodiment apparatus 20 one or the other or both of movable member 30 and first member 42 may be passive. That is, either or both of members 30 and 42 may have resistance members, such as sliding pads or wheels whose resistance increases as tightened, incorporated into their bodies, or into their motion transmission members, such as may apply an adjustable or calibrated amount of resistance to motion of the member. They are passive, however, in the sense of not providing feedback signals, and not being self-adjusting in real time according to programming corrections based on live feed-back.

Alternatively, apparatus 20 may have sensors, or sensing apparatus, or feedback apparatus or monitors or monitoring apparatus, indicated generally as 70, by which position, motion, and force may be observed, recorded, operated or adjusted, as may be. The monitors, or sensors, may include optical or RF or other recording equipment, such as cameras, and those cameras may include a first camera taking, for example, a front view as a camera 72, a left side view as at camera 74, a back view as at camera 76, a right side view as at camera 78, and a top view as at camera 80. The monitoring equipment may also include optical or other body-worn or clothing worn sensors 82, such as at cuffs, elbows, shoulders, knees, hips, ankles, feet, head and so on as may be. This may permit the position and time v. position correlation of various parts of the body to be observed and measured during motion. Apparatus 20 may also include load sensing equipment, whether in the form of stress gauges in the sporting equipment or in the drive or transmission, or in terms of drive electrical current draw monitors from which forces acting on the tool and on the moving member can be observed.

Apparatus 20 may include a programmable computer, 90, which may be operatively connected to monitor, and to receive inputs from, the various sensing apparatus in real time. Computer 90 may also be programmed to output location, force, displacement, and velocity values to the drives controlling the position of movable member 30 and first member 42.

As described above, apparatus 20 may have a circular track or guideway 46 that is movably connected or attached to base 26. This mechanism allows the circular track 46 to rotate about the vertical or z-axis. Circular track 46 is able to rotate freely or can provide resistance. Movable member 30 may be considered to be a rider that travels along circular track 46. It may move freely along circular track 46 or it may have a resistance-providing mechanism in it that resists its motion along track 46. The resistance may depend on the direction of motion, or the velocity, or both. The rider is attached to the sport or other activity equipment 38 in this example. The sport or activity equipment 38 may be one of many different kinds. In some embodiments the attachment or engagement to the rider may be by, or may include a tether 64 on at least one connection or engagement point. The tether's connection may be attached or detached by means of an attachment mechanism such as engagement fitting 34. The tether itself may be connected to the rider as part of an attachment or engagement mechanism or fitting 34. The attachment mechanism may allow the length of the tether to be increased or decreased. The tether may include a filament member, be it a string or lace, or wire, or cable, or strap or webbing, as may be. The tether may be a simple string or a complicated yoke requiring multiple attachments to the sport or activity equipment and to the rider. The sport or activity equipment may have an additional component, or components 66 added to it to improve or change the exercise or swing experience. That is, component 66 may be, or may include a biasing weight or weights; or may include a length extension such as may change the overall feel or balance of the part. In an alternate embodiment, all else remaining the same, the circular track 46 may have a non-circular shape, e.g., whether elliptic, or parabolic, or some other arcuate form. All embodiments discussed herein may have an alternate embodiment comprising of a non-circular track.

Apparatus 20 may be operated in a passive condition. That is, a user may position himself or herself on base 26, with an appropriately engaged tool. The sweeping motion may then occur, at the will of, and driven by, the user. To the extent that the drives and transmission may be operated, their operation may move the tracking apparatus, and all of first member 42 and so on, such that it presents little or no resistance to the action imparted by the user. Such a "no-load" condition may be used to observe the user's natural, or initial swing motion, to establish a baseline condition, or starting point. Alternatively, the user may, without connection to apparatus 20, swing the sporting equipment or other object merely for the cameras to record, and thereby to obtain baseline data.

Alternatively, the user may hold the tool, the sporting apparatus as may be, and may engage apparatus 20 interactively. Change of operation between passive and active modes, or operation of apparatus 20 (or any other apparatus herein) more generally, may be commenced, changed, or stopped by a remote unit such as the user may have, or such as may be operated from a computer, be it a lap top or remote console or PC. Where a strengthening is required, apparatus 20 may be set to present a constant resistance to motion, or to present a resistance to motion that varies as a function of position along the arc, or as a function of the speed of motion, or both.

Still further, apparatus 20 may be used as a device to train, or to condition, or change, the swinging motion. For example, in an initial activity, the user may be filmed or otherwise recorded while engaged in the activity of interest, such as swinging a golf club, or a baseball bat, or a hockey stick, or a tennis racket. This may be done in a "no-load" condition, and may possibly be done remotely from apparatus 20. It may be convenient to undertake this activity on apparatus 20, and to use the sensors 70 of apparatus 20 to record the activity. This activity can be termed the "initial swing", or the initial baseline condition.

The initial swing may then be compared to a desired swing, or datum swing (or simply "the datum". Apparatus 20 may then be programmed to cause the drives to present resistance to the user's swing that may tend to cause the user to swing more smoothly in a manner conforming to the desired datum. That is, the sensors 70 of apparatus 20 may monitor the position, speed, and force at the tool interface and may in real time adjust resistance to that motion, either to increase or to decrease along the arc to encourage the user's motion to match the desired arc. In general, each of velocity and force may vary as a function of position along the arc, whether defined in terms of path length or in terms of angular position.

Through repetition the user's motion may develop over time to follow the datum arc. The resistance may be in the direction of the arc. It may also provide resistance in directions transverse to the desired arc, to encourage the user to follow the arc in a smooth swing, rather than to deviate out of the line of the arc. That is, a training regime may include training to follow the arc more closely, whatever the load or force may be. I.e., in one aspect it is a question of training for line, rather than of training for force or speed along a given line or arc of motion. Training for force or speed may follow a period of training to follow a particular line of arc. The training regime may also include starting at a slow speed of swing, or at a low level of force of swing, or both. Then, after a period of many repetitions at that slower speed or lower level of force, as progress is made the speed or force required can be increased in controlled, incremental amounts or steps that are suitable for the user's level of practice and muscular development.

The resistance may be force-limited. That is if the resistance is too high at any given point along the arc, the user may be injured, or may develop an injury during repetition of the activity, or may develop the wrong stroke, or may simply become frustrated or discouraged, and discontinue the activity. It may also be that a certain level of strength is required at one portion of an arc, and a different level of strength is required at another. Alternatively, when a person is first training to follow a particular schedule, their muscles may not be accustomed to the desired motion, and may not have either the desired level of strength or control generally, or the desired level of strength or control at particular locations along certain portions of the range of motion. Part of the training regime may be progressively to increase strength, or to increase the range of arc over which the muscles have a desired level of strength. That is, the approach may work on levels of strength, or it may work on improving range of motion, or both. Where it is working on a force-limited approach, the resistance may be programmed to increase in particular increments until the desired level is reached. At any such level, the apparatus may be programmed to sense force during the swinging motion, and to become more compliant (i.e., less resistive) when that force reaches a particular value. That limiting threshold value may be constant, or it may vary as a function of arc position. In operation, the user applies the forces, and drives the motion. Apparatus 20, in interactive mode, seeks to sense the applied force, and to react accordingly to maintain the force, speed, and motion parameters generally. In some modes, programmable computer 90 may be programmed to simulate contact with an object. For example, it may provide a momentary increase in resistance to simulate a tennis ball being engaged by the racket; or a puck or ball being engaged by a hockey stick; a baseball or softball, or cricket ball being struck by the bat; or a soccer ball or football being contact as struck while kicking. This simulation of contact may start with a reduced force, and, over time, may increase as suitable.

Although the present discussion is made in the context of training for a sport in which a swinging motion is required, it may also be used for training for non-sport motion, as in dance, or repetitive motions in a work environment; or for physiotherapy and recovery of range of motion and strength, as for example after injury. While it is assumed that apparatus 20 is of a size to permit a user to stand within the sweep of member 42, it may be appreciated that a small apparatus could be used where the motion to be practiced only involves, for example, the leg below the knee, motion of only the shoulder, motion of only the elbow and wrist; motion of only the wrist and hand; motion of only the hand, and so on.

In various alternate embodiments, the operation of apparatus 20 (or the other embodiments of apparatus shown or described herein) may include steps in which programmable computer 90 is provided with programs or applications to operate apparatus 20. Those programs may include method steps in which a person may enter information about himself or herself. For example, the user may enter identification information or parameters of a muscle or muscle group that he or she would like to improve. The user may include a photograph or video in the material input to memory or by taking a picture or video of themselves. The program may then calculate the input parameters for the suitable height setting of base 26 relative to the center of rotation of the equipment, and the correct schedule for the desired arc of motion. The schedule may be at least partially virtual, as may be appropriate in respect of apparatus 20 of FIGS. 1a, 1b and 1c; or it may be physical, as in the positioning of the track on a tilt angle alpha in apparatus 120 of FIGS. 2a, 2b and 2c, described below. That is, the program application may recommend exercises or proper swing paths suited to that particular person based on the input parameters. The use of sensors 70, and body sensors 82, may permit computer 90 to determine whether the user is standing or sitting, or otherwise positioned, correctly on base 26. Alternatively, apparatus 20 may include a display screen, or may provide a feed to a display screen, which may be the screen of computer 90, to show the user where to stand on base 26, as by providing a representation of the person on the screen and the position and posture. The correct foot placement can also be projected onto base 26. Computer 90 may also have a voice interactive control capability, such as to enable it to stop or to adjust, and also to enable it to prompt the user to make adjustments in position or stance e.g., prior to starting. It may prompt the user to move the right foot forward, to turn the left foot, to move backward, and so on, as may be appropriate. To the extent that the user is being filmed at the same time, the two images can be presented together on the screen, and the user can see how to adjust position and posture according to the image presented by the programming application. During operation the program is bi-directional, or interactive, in the sense of having both monitoring and feedback capability. It can acquire data from sensors 70 and such as may be embedded in the rider and other components to provide analysis to the user.

Figure 2A:
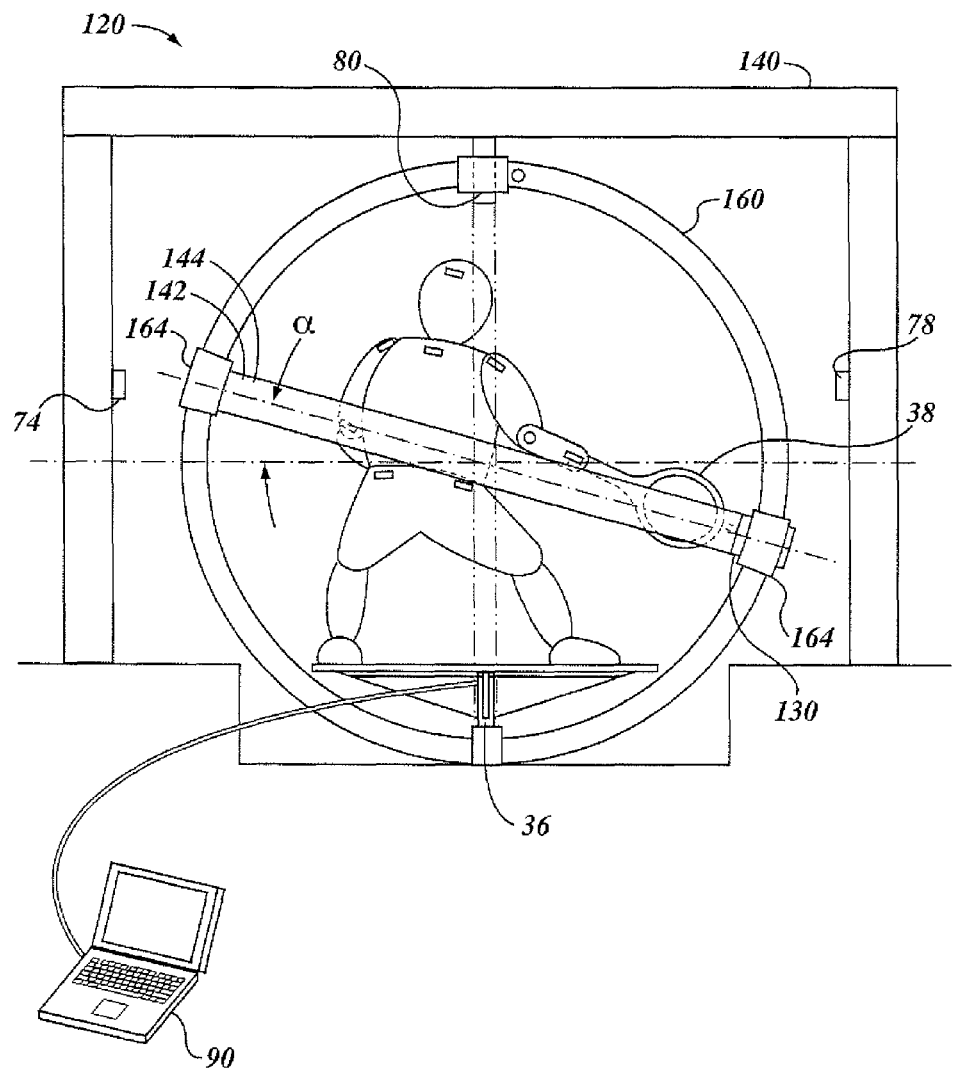
FIG. 2a shows a front view of an arcuate motion apparatus according to an aspect of the invention.
Figure 2B:
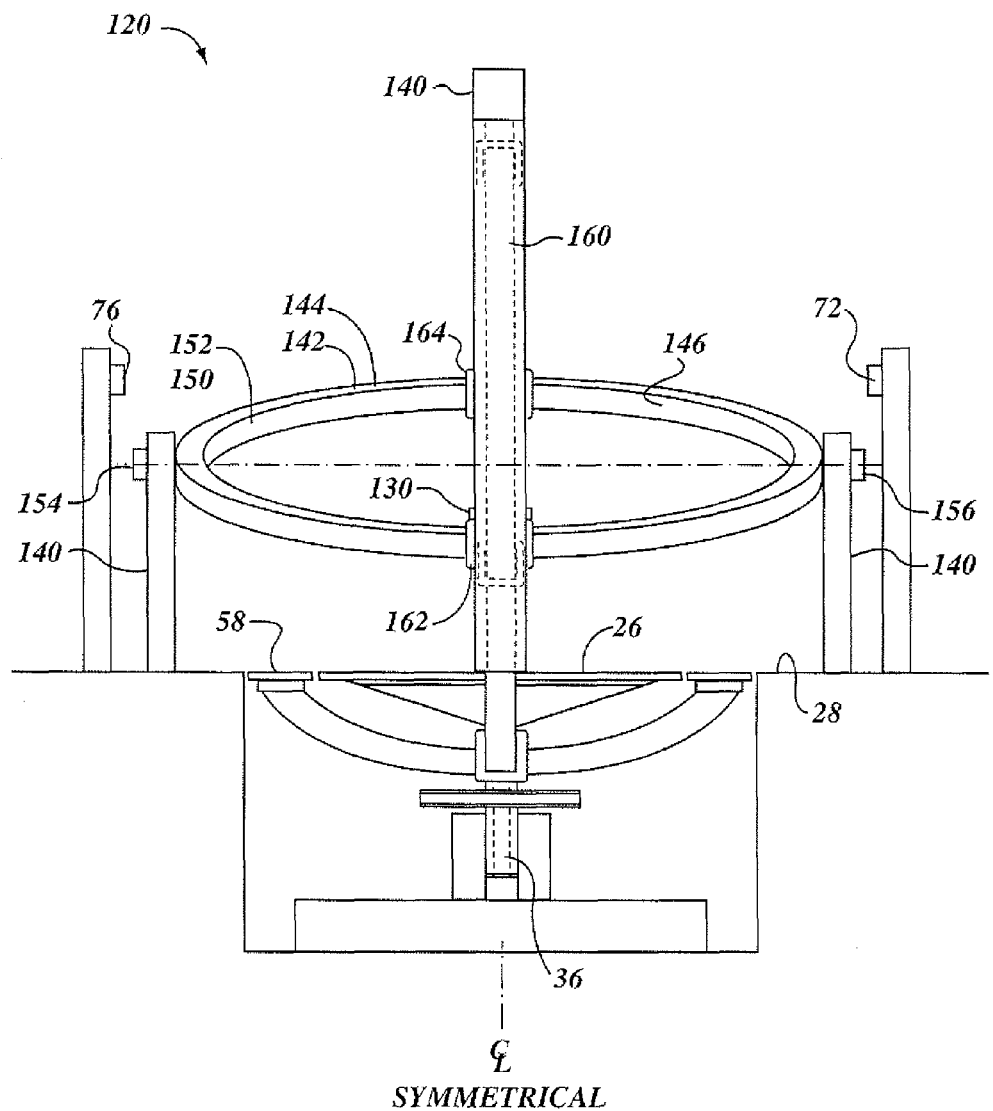
Figure 2C:
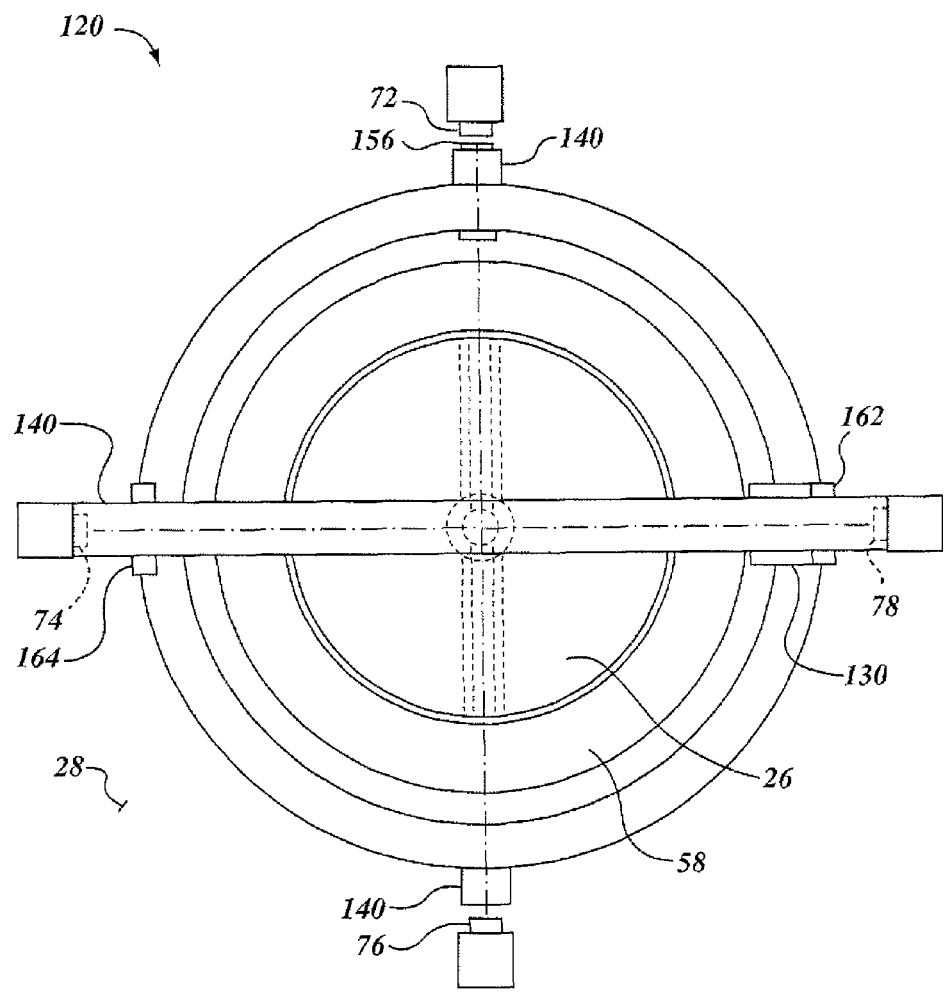

It may also be that there may be an alternative embodiment of apparatus 120, such as shown in FIGS. 2a, 2b and 2c. Apparatus 120 may have a moving member 130 that, as before, is mounted to a first member 142 which may have the form of a circular ring 144. Ring 144 may have a track 146 to which moving member 130 may be mated. Ring 144 may be provided with a drive 150 and transmission member, or members, 152, connected to drive or to govern moving member 130 according to a particular velocity or force profile. First member 142 is mounted to a stationary member or framework 140 such as at diametrically opposed pivot mounts 154, 156 that allow first member 142 to be inclined, or tilted, at any angle between horizontal and vertical, represented in the illustrations as angle alpha. Apparatus 120 also includes a second member, 160, such as may also have the form of a ring that lies outside the diameter of ring 144. Second member 160 may have the form of a circular ring, and may have releasable securement fittings, such as clamps 162, 164. In this way any circular swinging stroke path angle, alpha, can be selected and fixed. Apparatus 120 may then permit swing motion only along the chosen circular arc. In effect, the adjustment or tilt angle of first member 142 is a setting of the co-ordinate system of the apparatus such that the swinging motion lies in the plane perpendicular to the axis of revolution of ring 144.

There are many alternate embodiments and features. In the interests of brevity, unless noted otherwise those embodiments have the same, or substantially the same, features and functions as the embodiments of FIGS. 1a, 1b and 1c, on one hand; or of the embodiment of FIGS. 2a, 2b and 2c on the other. The features of the various embodiments may be mixed and combined, as may be appropriate, without further repetition herein of all of the permutations and combinations of those features as may be possible.

In the embodiment of FIGS. 1a, 1b and 1c, the desired arc or pathway, or guideway is virtual. That is, the user can move the tool through an infinite number of paths within the spherical operational envelope. Apparatus 20 works to govern the response to encourage the user to follow a particular arc and force or arc and velocity profile, according to the datum profile stored in memory on programmable computer 90. In that sense, the schedule of the arc is virtual, or is implemented by virtual, or electronic, means.

In the embodiment of FIGS. 2a, 2b and 2c, while the force and velocity profiles as a function of arc position may still be monitored, governed, or driven, by the parameters stored in the computer memory, the path, or track, itself is not virtual, but rather is constrained to the inclined track of first member 142. It is a physical constraint or schedule as opposed to a virtual constraint or schedule. It is a schedule of position, if not of force or velocity.

FIG. 3 is a front view of an alternate embodiment of apparatus 220 to that of apparatus 20 of FIGS. 1a-1c. In apparatus 220, there is a resistance providing mechanism 230 that is mounted externally. The resistance-providing mechanism 30 converts the rotary motion of the circular track 46 about the vertical axis into a pull or extension on the string 232. This string 232 may be attached to a winding mechanism, such that when track 46 moves, the winding mechanism turns, tending to raise or lower the weights 234 that impose tension on the string or cable or rope 232. The resistance mechanism may be engaged or disengaged, tightened or loosened to increase or decrease resistance as may be appropriate. The weight stack of weights 232 may be a variable weight stack. When the mechanism pulls on the cable, weights 232 are lifted upwards. When the force is removed from member 42, the weights pull it back in the other direction about the vertical axis, thus yielding a reciprocating motion.

Figure 4:
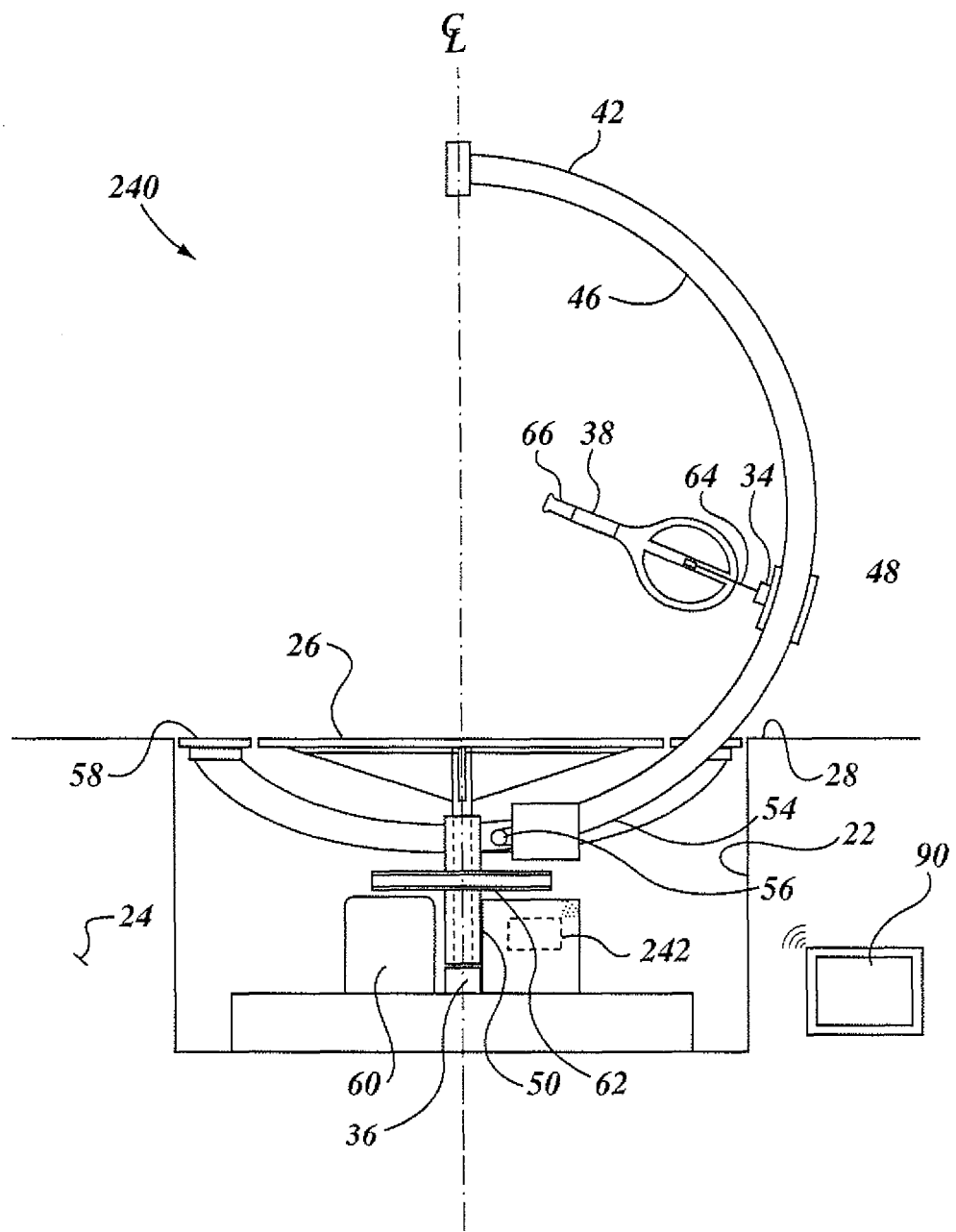
FIG. 4 is a front view of an alternate embodiment of apparatus to that of FIG. 1a, with a platform perturbation mechanism.

FIG. 4 shows a front view of an apparatus 240. It has a perturbation mechanism 242 that has the ability to perturb (rotation, resistance, balancing functions, vibration, tilting, etc.) base 26. Mechanism 242 may be controlled by a manual (not shown) or computerized control mechanism, such as computer 90.

Figure 6A:
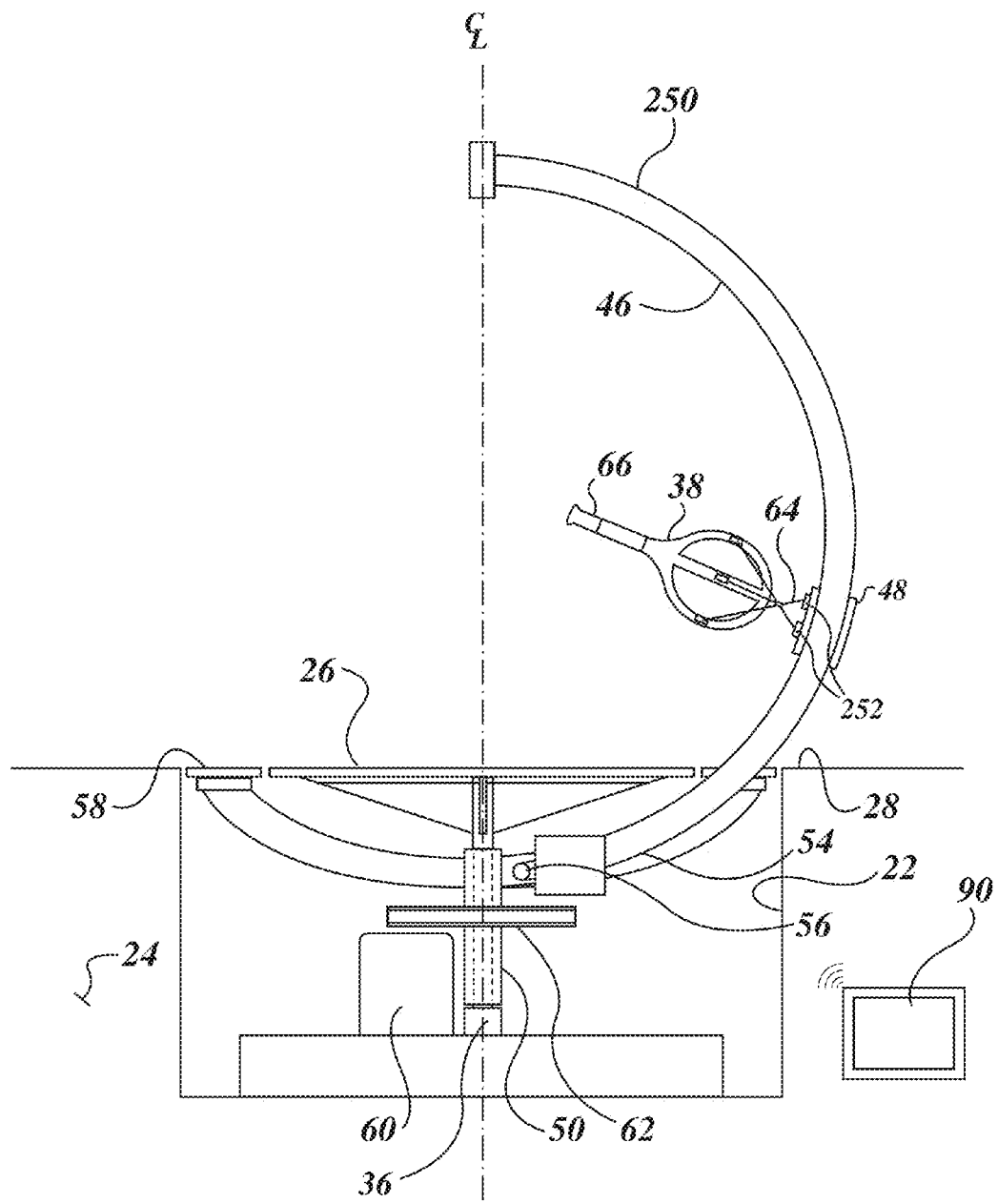
FIG. 6a is front view of an alternate embodiment of apparatus to that of FIG. 1a, having a tether yoke.
Figure 6B:
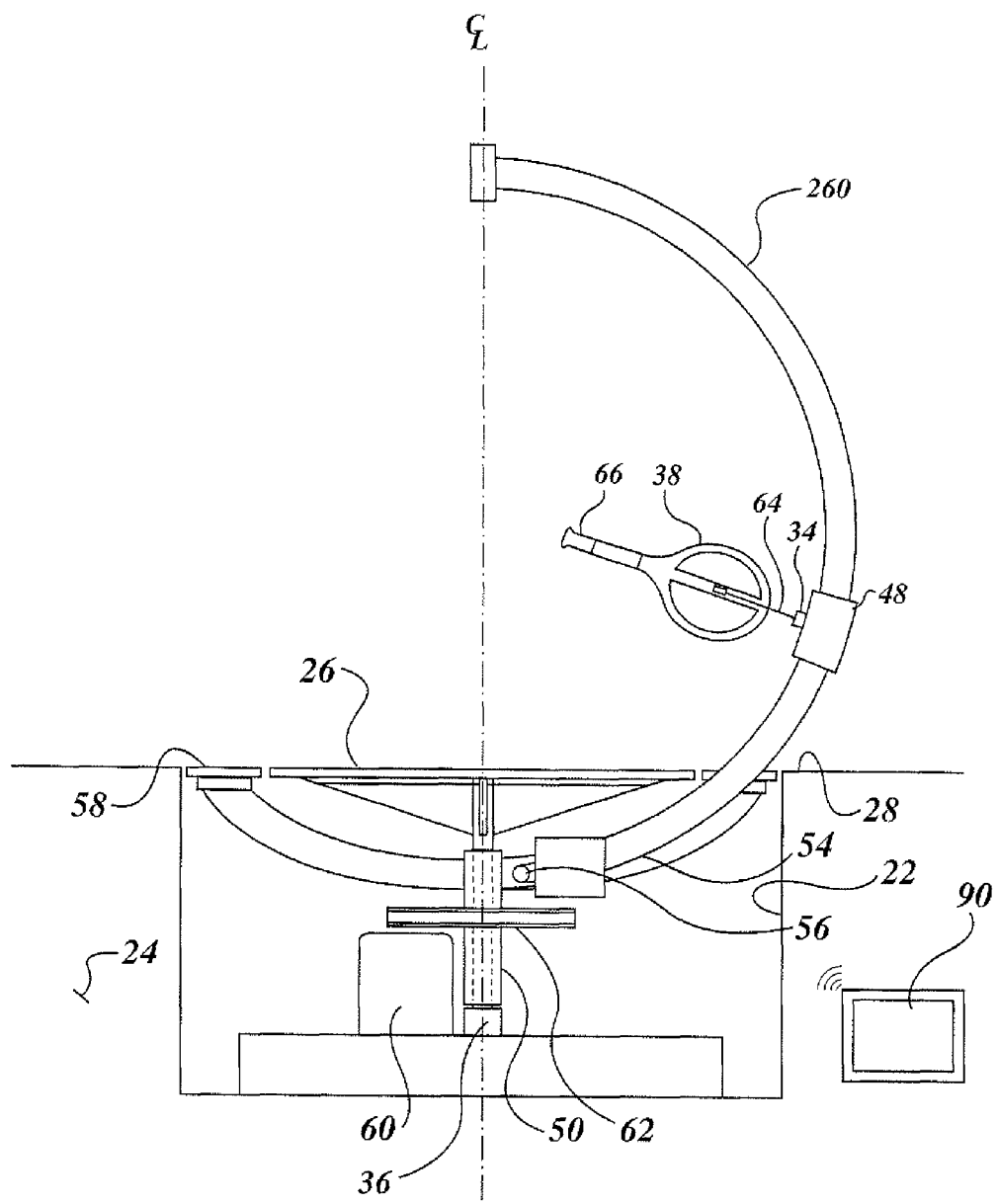
FIG. 6b is a front view of an alternate embodiment of FIG. 1a, having with a tether resistance-providing mechanism.
Figure 6C:
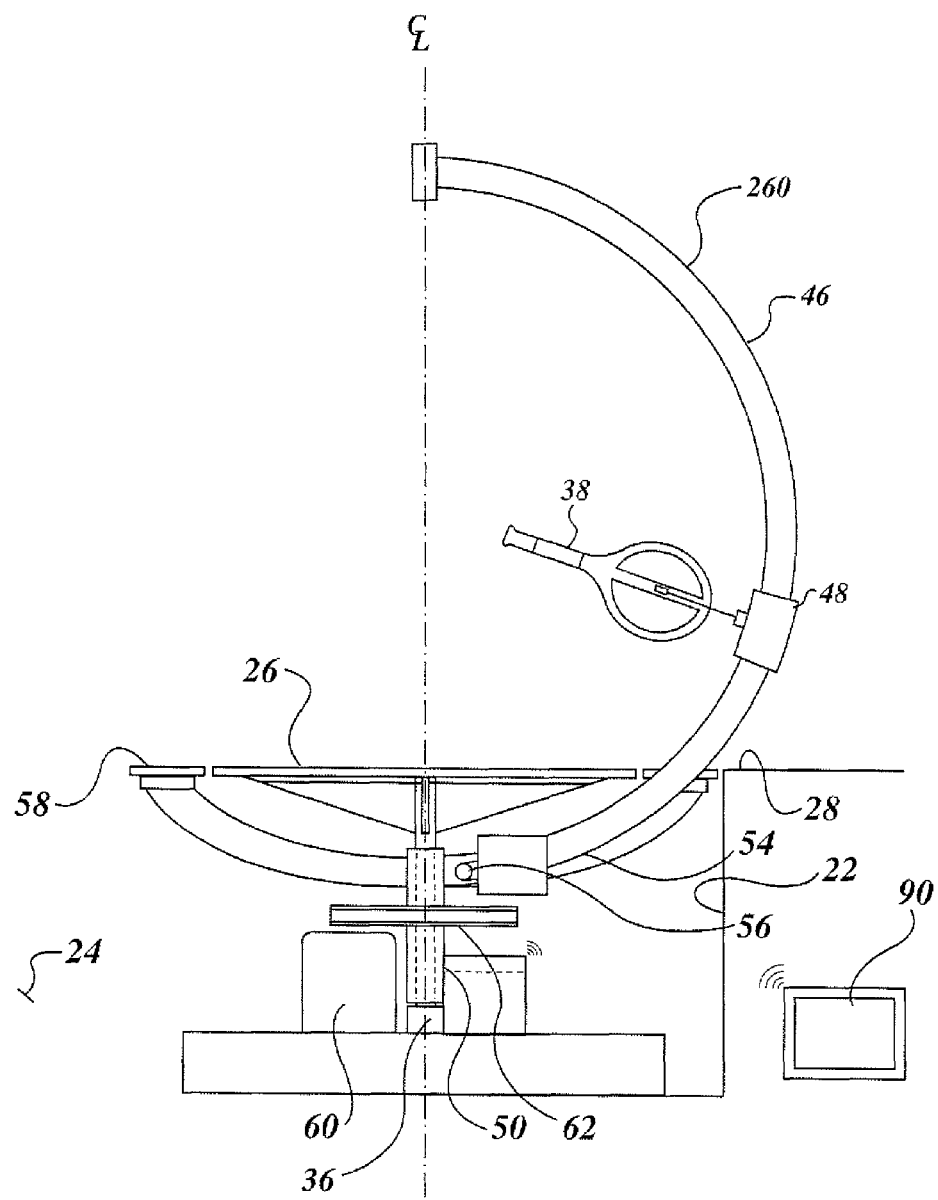
FIG. 6c is a front view of an alternate embodiment to that of FIG. 1a having a circular track lateral-adjustment mechanism.
Figure 6D:
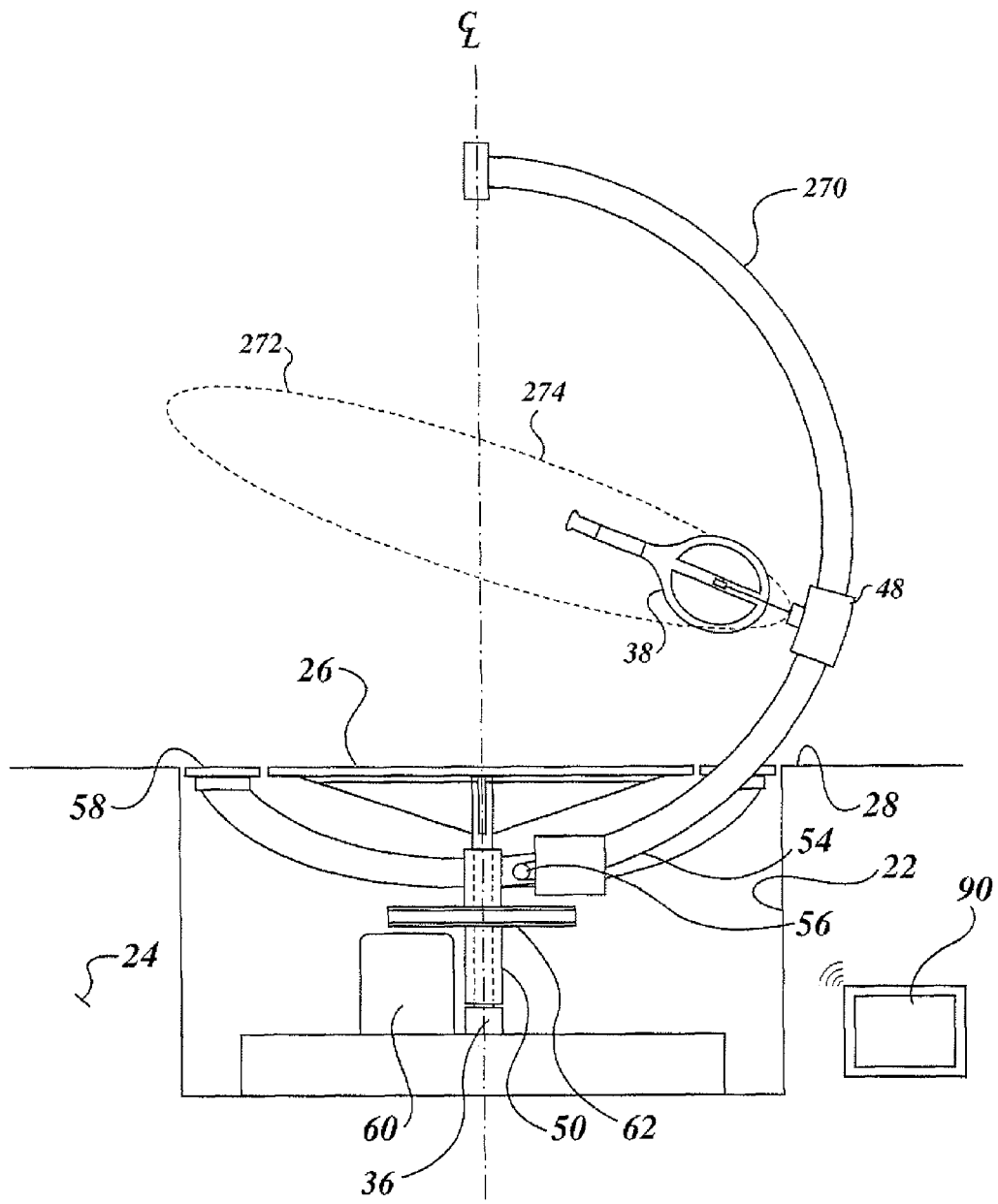
FIG. 6d is a front view of an alternate embodiment of FIG. 1a with a rider trajectory mechanism.

FIG. 6a shows a front view of an apparatus 250, in which the tether has a yoke 252 that allows for one or more (two in this drawing) attachments to the sport or activity equipment 38 and the rider or sleeve 48. FIG. 6b shows a front view of an apparatus 260 in which the tether has a resistance-providing mechanism within it. This mechanism pays out or retracts the tether. The resistance of the tether portion may be a friction or spring-based resistance, or may be a magnetic or haptic (i.e., touch-based) resistance of a resistance provided or controlled by a servo motor or system. The resistance may be controlled by a manual or computerized control mechanism. FIG. 6c shows a front view of an apparatus 260 in which the circular track 46 may move laterally in the horizontal plane at its base such that the center of rotation of first member 42 may be eccentric to the center of base 26. Circular track 46 may still rotate about the vertical axis, but the axis of rotation of the platform base 26 is offset relative to the axis of rotation of the track. The eccentricity mechanism may be controlled by a manual or computerized control mechanism. FIG. 6d shows a front view of an apparatus 270 in which the rider 48 has a trajectory mechanism, or cam, or guide ring 272 shown in phantom, that guides the rider or sleeve 48 along a particular track or path on the circular track 46 as a function of its rotation about the vertical axis, raising or lower sleeve 48 as it goes. This trajectory mechanism allows the rider to follow a planned or programmed schedule or trajectory 274 in 3D space such as a circular path (shown in FIG. 7). The guiding mechanism may be controlled by a manual or computerized control mechanism. In each case there may be a sensor array or tracking mechanism, analogous to sensors 82, on the sport or activity equipment or on the rider 48, or both. This tracking mechanism provides movement information to a computer.

Figure 7:
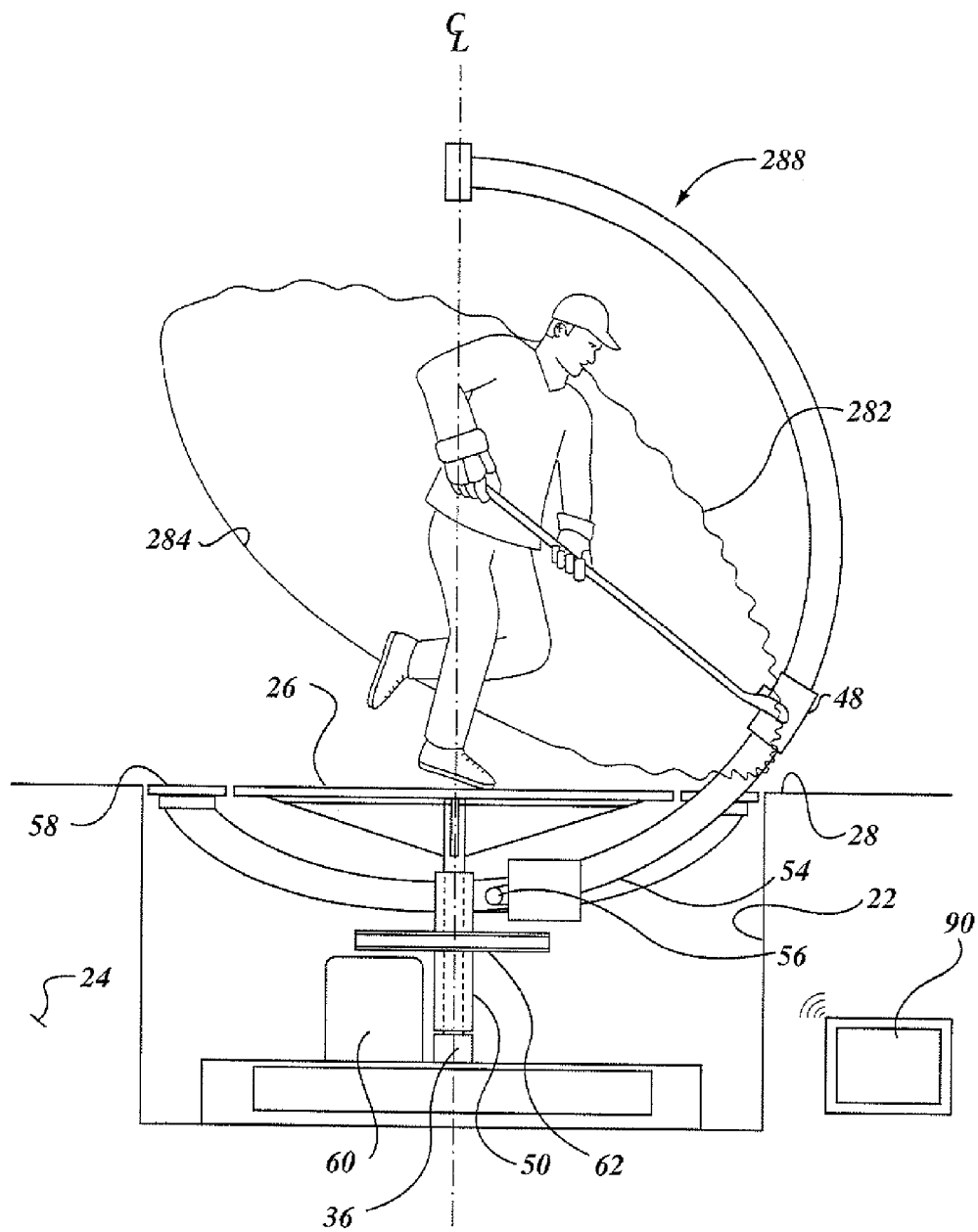
FIG. 7 is a front view of an alternate embodiment of FIG. 1a with a bi-directional communication mechanism.

FIG. 7 shows a front view of an apparatus 288, in which there is a bi-directional communications apparatus through which the resistance is controlled by a computer device such as programmable computer 90, through a wired (not shown) or wireless connection. In this figure, the squiggled swing lines 282 represent a region of increased resistance and the straighter swing lines 284 represent regions of lesser resistance. Although the figure shows one of each region, multiple regions may be programmed if desired.

Figure 8:
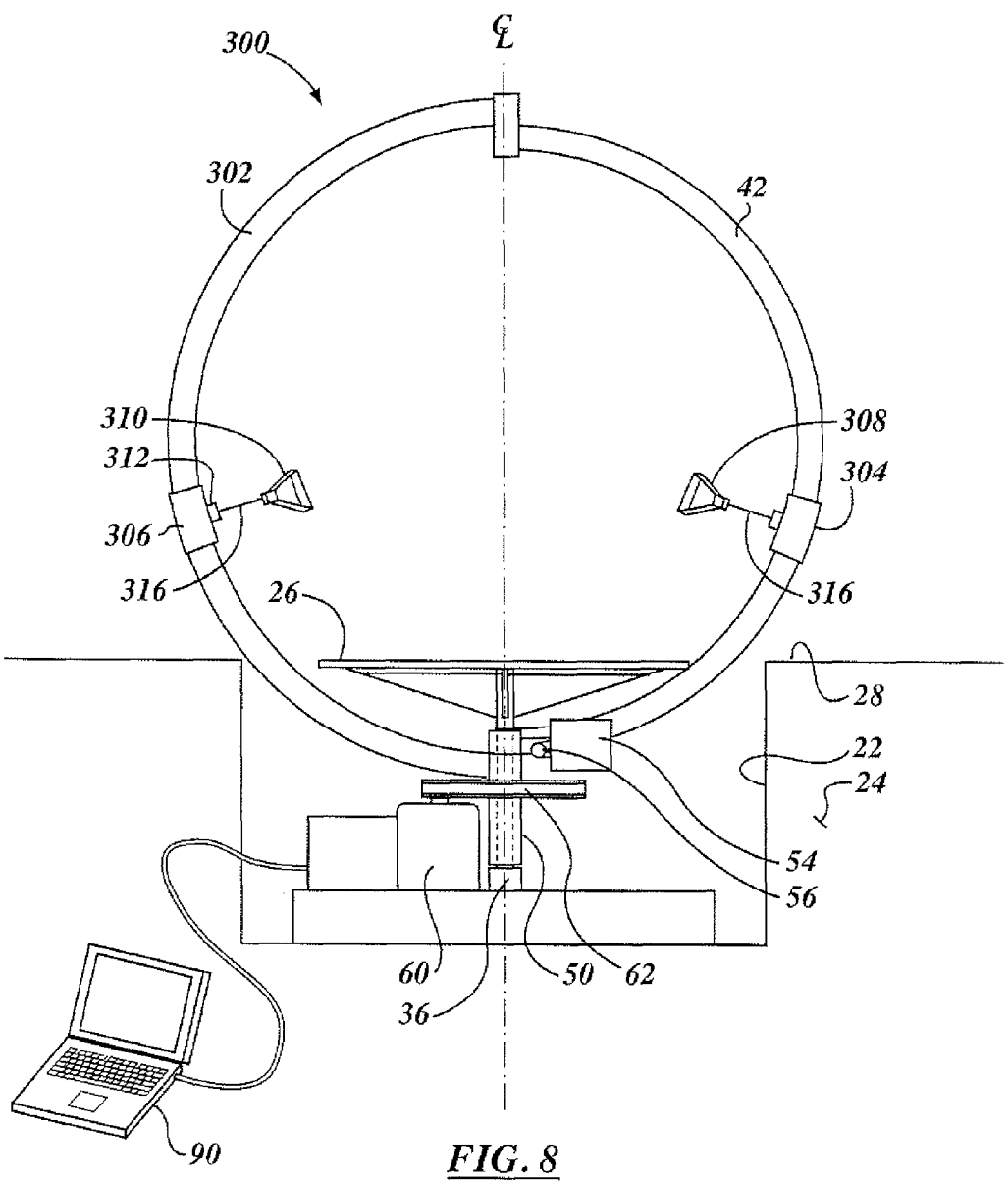
FIG. 8 is a front view of an alternate embodiment of apparatus to that of FIG. 1a having a second circular track.

FIG. 8 is a front view of an alternate apparatus 300 in which there is both a first or primary, or left hand, arm or bow member 42, and a second or right hand such arm or bow member 302. Each of 42 and 302 may have a semicircular track (i.e., a track formed on an arc of a circle) that is movably attached to base 26. This allows the two circular tracks to rotate about the vertical axis. Circular tracks 42 and 302 may both rotate free of resistance to motion (i.e., provide free rotation), or may provide resistance as discussed above.

Apparatus 300 has two riders 304 and 306 that travel along the circular track 46 and 302 respectively. Riders 304 and 306 can move freely along circular tracks 46 and 302. Alternatively they may have resistance-providing members that oppose motion along the respective circular tracks. The resistance may depend on the direction of motion. The riders may be attached to two different pieces of sport or activity equipment 308 and 310. Alternatively the riders may be attached to the same sport or activity equipment, such as, for example, a single bar with two attachment pieces (not shown). Alternatively, one may choose to use only one of the two arms in a manner similar to other embodiments discussed above. The second sport or activity equipment 310 may be attached to the second rider by a second tether on at least one point. The second tether's connection with the second may be attached or detached by means of the second attachment piece 312. The second tether is connected to the second rider by the second attachment mechanism. The second attachment mechanism may allow the length of the second tether to be increased or decreased. The second tether may have at least one string or cable. That tether 316 may be a simple string or cable, or it may be a complicated yoke having multiple attachments to the second sport or activity equipment 310 or to the second rider.

Figure 5:
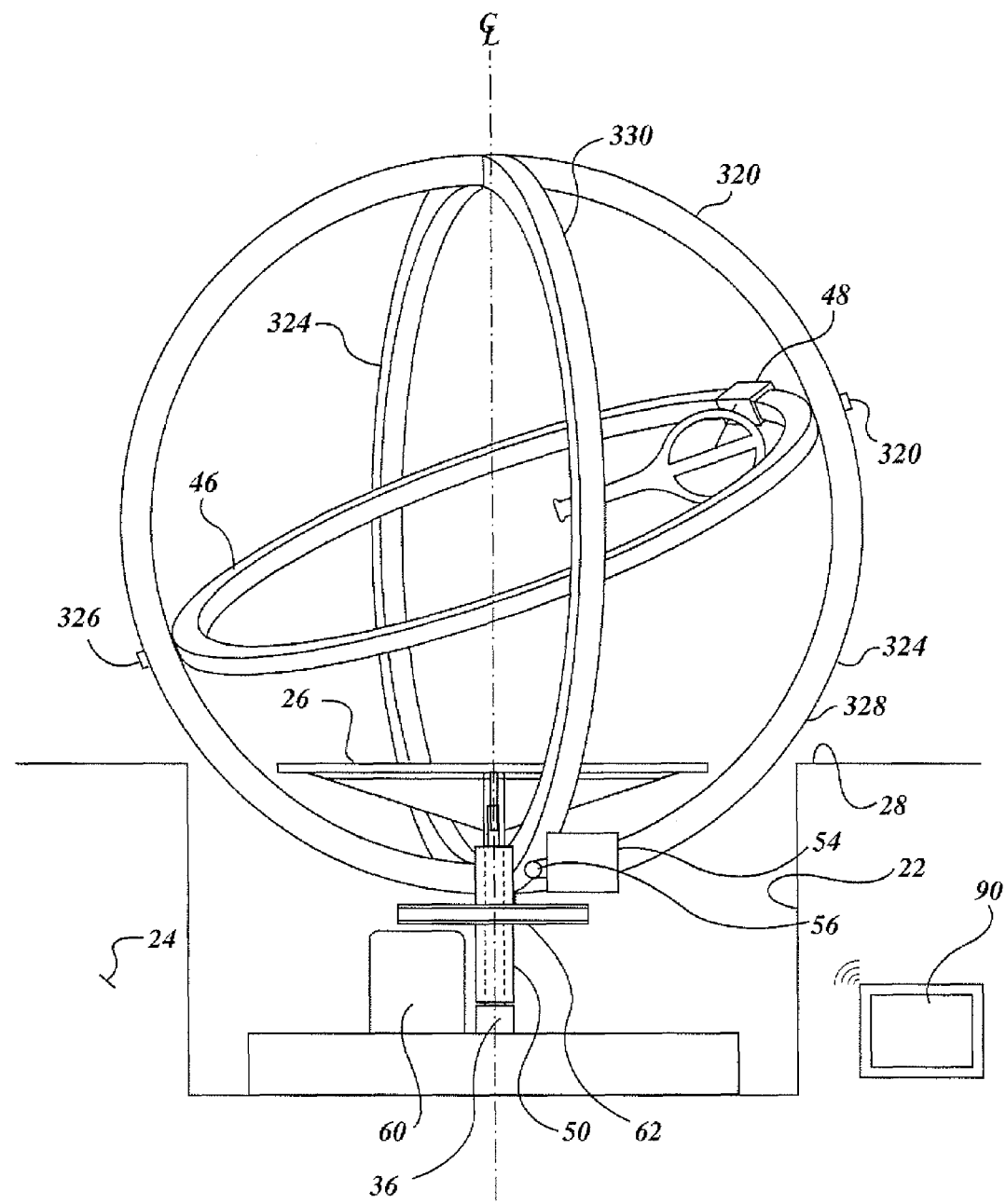
FIG. 5 shows an alternate embodiment of apparatus to that of FIG. 2a, in which anchors and anchoring mechanisms secure an adjustable circular track in a selected angular orientation.

FIG. 5 shows a front view of an apparatus 320 that is fundamentally similar to apparatus 120. As before, base 26 allows the platform to be raised or lowered relative to foundation 24, and relative to the center of rotation of the rotating armature and track or guideway. Apparatus 320 has one or more track anchors, or frames 324 attached to the base by a mechanism that permits rotation and that can perform all applicable functions mentioned in respect of the previous embodiments. The frames have anchoring mechanisms, such as clamps or securement fittings 326 that may releasably secure circular track 46 in a particular tilted orientation. The circular track 46 can be any portion of a circle and can be held at any angle by the anchoring mechanisms 326. As before, a rider such as slider 48 travels along circular track 46. Rider 48 may move freely along circular track 46 or may have a resistance-providing mechanism in it that resists its motion along the circular track 46. Resistance may depend on the direction of motion.

Figure 9:
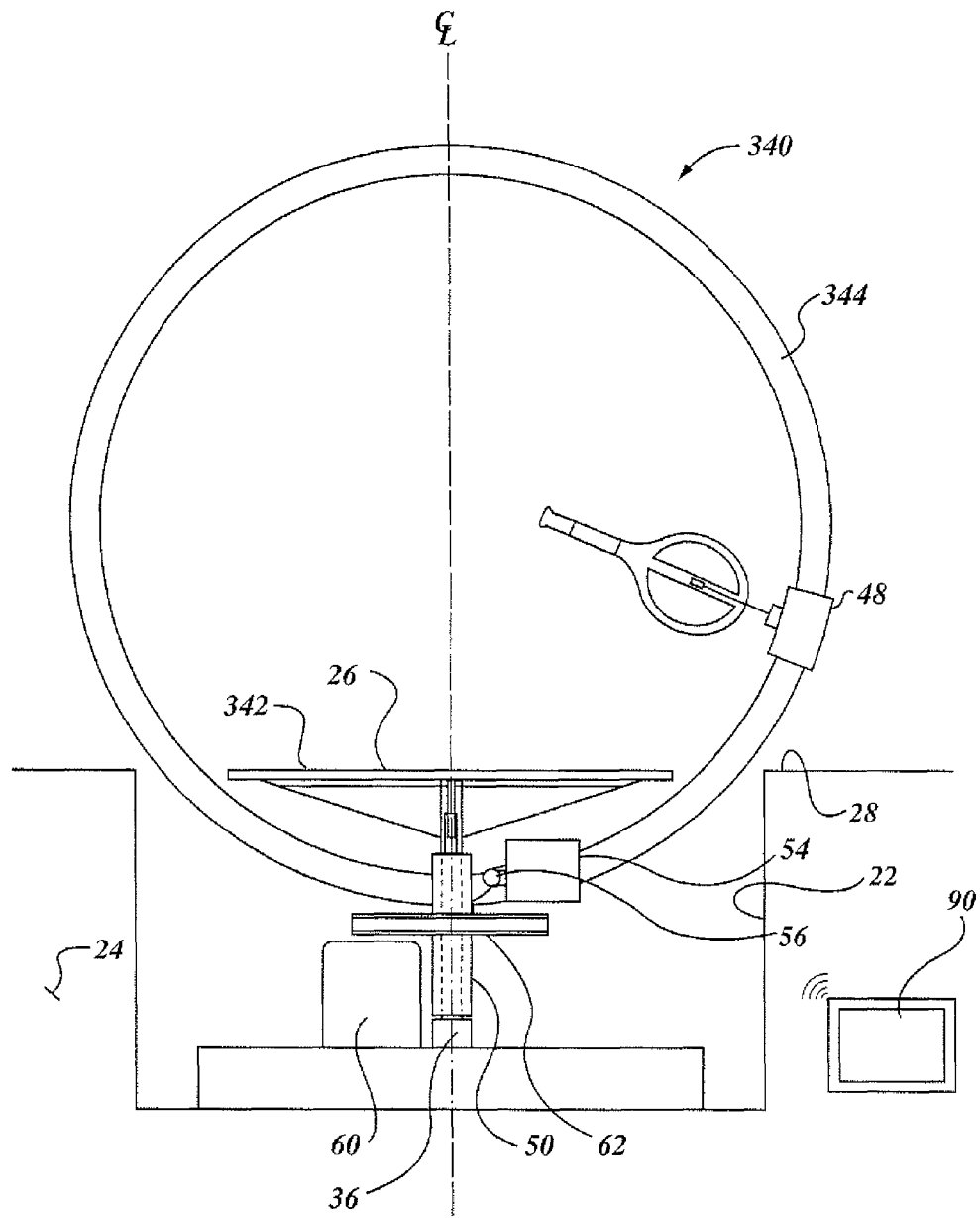
FIG. 9 is a front view of an alternate embodiment to that of FIG. 1a with a fully circular track.

FIG. 9 shows a front view of an apparatus 340, in which there is a platform 342, which may be raised or lowered. Apparatus 340 has a fully circular track 344 that is attached to the base 26 by a mechanism 50. This mechanism 50 allows the fully circular track 344 to rotate about the vertical axis. This embodiment permits motion along a fully circular overhead track. It may rotate freely or may provide resistance. The sleeve or rider 48 travels along the fully circular track 344. Rider 48 may move freely along fully circular track 344 or may have a resistance-providing mechanism that resists motion along track 344. That resistance may depend on the direction or the velocity of motion, or both. Rider 48 is attached to the sport or activity equipment, which may vary. Apparatus 340 may be used in training for overhead stroking motion, whether a motion such as a serve in tennis or volleyball; a throw as in cricket or football or baseball; a swimming stroke; or merely as a stretching activity to improve range of motion.

FIGS. 10a-24 show examples of sports or activity equipment 38 that may be used an alternative to the sport or activity equipment of FIG. 1a and so on, shown in the above figures. On each piece of equipment there is at least one attachment mechanism or engagement fitting 34. The attachment mechanism or engagement fitting provides the means for attachment to the above described apparatus. The dimensions of the sport or activity equipment may vary along with the type of apparatus, as may be appropriate. It may include external or separate attachment fittings that attach to an actual piece of sport or exercise equipment, or may be specially made fittings. The sport or activity equipment may have additional elements, such as an extension or biasing or conditioning weight added to it to improve or change the exercise or swing experience as may be deemed suitable.

Figure 10A:
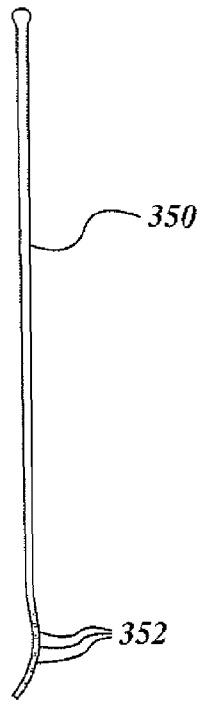
Figure 10B:
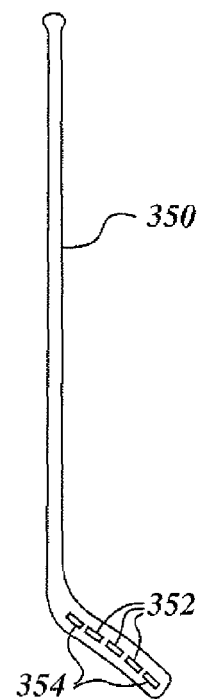
Figure 10C:
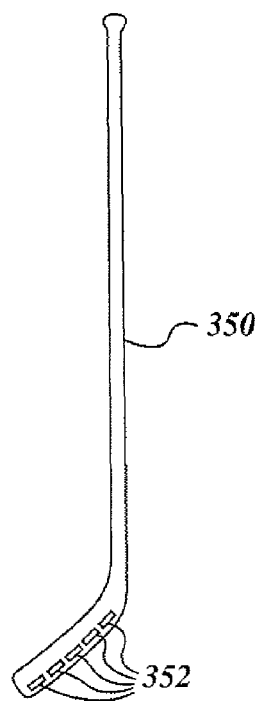

FIG. 10a shows a front view of a left-handed hockey stick 350. It is intended that illustration of a left-hand stick is sufficient also to illustrate a right-handed stick, the two being mirror reflections of one another. Stick 350 has one or more attachment interfaces, or mechanisms or fittings 352. Sensors 354 may also be mounted at these locations. FIG. 10b is a left hand view of stick 350. FIG. 10c is a right-hand view of stick 350.

Figure 12A:
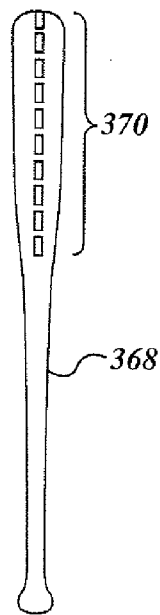
Figure 12B:
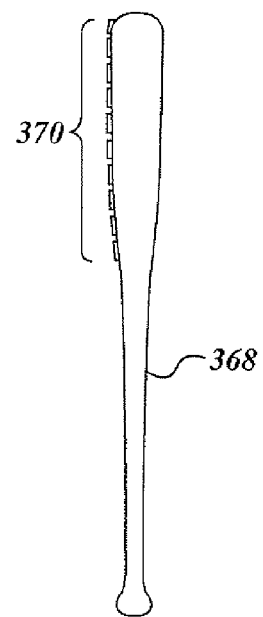
Figure 12C:
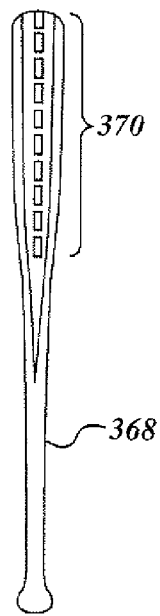

FIG. 11a is a front view of a tennis racquet 360. It possesses one or more attachment interfaces, mechanisms, or fittings 362. FIG. 11b is a right hand view of tennis racquet 360. FIG. 11c is a top view tennis racquet 360. FIG. 11d is a front view of a modified tennis racquet 364 having an extension or weight 366. FIG. 11e is a right-hand view of tennis racquet 360. FIG. 11f is a top view of a tennis racquet 360. FIG. 12a is a front view of a baseball bat 368 having one or more attachment interfaces, mechanisms or fittings 370. FIG. 12b is a perspective right hand view of baseball bat 368. FIG. 12c shows a rear view baseball bat 368. FIG. 13a is a palm view of a hand strap apparatus 372 having one or more attachment interfaces, mechanisms, or fittings 374. A similar embodiment can be made for the foot or any other body part. FIG. 13b is a dorsal, or back of the hand, view of apparatus 372. FIG. 13c shows a left-hand view of apparatus 372. FIG. 14a is a front view of a football 376 having one or more attachment interfaces, mechanisms or fittings 378. FIG. 14b is a right-hand view of football 376.

FIG. 15a shows a front view of a badminton racquet 380 having one or more attachment interfaces 382. It is very similar to a squash racquet sport or exercise handle. FIG. 15b is a right-hand view of badminton racquet 380. FIG. 15c is a front view of a modified badminton racquet 384 such as may have one or more attachment mechanisms 386. It may also have an extra grip component 388. FIG. 15d is a right-hand view of modified badminton racquet 384. FIG. 16a is a perspective front view of a soccer ball sport or activity equipment 390. It may have one or more attachment interfaces, mechanisms or fittings 392. A similar embodiment can be made for any other type of ball (ex. basketball, baseball, etc.). FIG. 16b is a top view of ball 390. FIG. 17a shows a front view of a table tennis racquet 394 such as may have one or more attachment mechanisms or fittings 396. FIG. 17b is a right-hand view of table tennis racquet 394. FIG. 18a is a front view of a lacrosse stick 400 such as may have one or more attachment interfaces, mechanisms or fittings 402. FIG. 18b shows a right-hand view of lacrosse stick 400. FIG. 19a shows a rugby ball 404 having attachment fittings 406. FIG. 19b shows a right-hand view of rugby ball 404. FIG. 20a shows a front view of a field hockey stick 410 having one or more attachment interfaces, mechanisms, or fittings 412. FIG. 20b is a right-hand view of field hockey stick 412. FIG. 21a shows a top view of a Frisbee 414 embodiment of the sport or activity equipment having one or more attachment mechanisms of fittings 416. FIG. 21b shows bottom view of Frisbee 414. FIG. 22 shows a front view of a golf club 420. Golf club 420 may be a real golf club, or it may be training simulation club, e.g., with the same hand grip but with adjustable dynamic parameters such as may change the club length, weight, and weight distribution (and therefore the moments of inertia of the club in dynamic activity during training). It may have one or more attachment mechanisms or fittings 422. By which to engage, or mate or secure club 420 to apparatus 20, or 120, or as may be. Club head 424 is attached to an adjustment mechanism 426. This adjustment mechanism moves and secures the club head to different parts of the club. By permitting head 424 to be moved up or down the shaft, adjustment mechanism 426 may permit different sizes of clubs to be simulated—be it a wood, a long iron, a short iron, or a wedge and so on. It may also be that weights may be added to, or removed from head 424, thereby changing the overall weight, the weight distribution, and the moments of inertia of the club. FIG. 23a shows a front view of a javelin 430 such as may have one or more attachment mechanisms or fittings 432. FIG. 23b shows a right-hand view of javelin 432. FIG. 24 shows a front view of an exercise handle 440 for use with fitting 34.

The operation of the swing or exercise apparatus is described in reference to apparatus 20, or 120 as may be. In any of the embodiments shown and described, to the extent that the height of base 26 is to be adjusted relative to member 42, this occurs before use. Similarly, where interactive tracking is to be used, as to compare the swinging motion with a baseline motion or a datum the user may activate the tracking sensors before using the apparatus. To the extent that can be done, the user may also program his or her desired size or shape, or both, of the circular track via the computerized control mechanism before using the apparatus. In one method, the user may first set the desired resistance for his or her swing or exercise on the resistance mechanism as applicable either to slider 48 or member 42 or to the tether, if used. Next, he or she adjusts the tether to a desired length and attaches it to the sport or activity equipment 38. The user then stands on base 26 and holds the sports or activity equipment 38 by the handle or its additional component (e.g., 366 or 388), or both. The user then attains the stance or posture, or position in which he or she commence the swinger exercise. In this stance, or posture, the sport or activity equipment 38 may starts from a position behind the shoulder. At this point, the rider 48 may be closer to the bottom of the circular track 46 near an end near or adjacent to platform base 26. The user then starts the swing or exercise and moves the sport or activity equipment 38 in an upward preferred motion. This movement pulls the rider 48. The force on the rider 48 is divided into two components. The first component pulls the rider along the circular track 46 and the second component pulls the circular track 46 around the vertical axis. The two components of motion give a curved trajectory to the rider 48 in 3D space. This trajectory is marked in FIG. 6d. The user may choose to travel the entire trajectory or may return the sport or activity equipment 38 back to its original position for the next swing. The user may repeat the swing. While practicing backhand strokes, where applicable, the user mirrors the action described above.

The operation of the swing exercise machine apparatus of FIGS. 2a, 2b and 2c is similar. First, the user establishes the position of track 46, and secures it in place. He or she then adjusts the circular track 46 to a desired angle via a manual means, or by a computerized device, as may be. Then, as applicable, the user sets the desired resistance for his or her swing or exercise on the resistance mechanism. Next, he or she adjusts the tether or other engagement interface fitting to a desired length and attaches it to the sport or activity equipment 38. The user then stands on the platform base 26 and holds the sports or activity equipment 38 by the handle or by its additional handle extension, or both, as applicable. The user then attains the stance he or she will assume at the start of the swing or exercise. In this stance, the sport or activity equipment may start behind the shoulder. The rider 48 may commence at a lower part of the circular track 46 near the platform end. The user may start the swing or exercise and moves the sport or activity equipment 38 in an upward motion along track 46. This movement pulls the rider 48 as before. The force on the rider 48 has one component, namely along the track. Out-of-line forces are physically constrained by the cross-wise rigidity of track 46. The user may choose to travel the entire trajectory or may return the sport or activity equipment 38 back to its original position for the next swing. The user may repeat the swings.

The operation of apparatus 220 of FIG. 3 is similar to that of FIGS. 1a, 1b, and 1c except that when the user swings the sport or activity equipment 38 and pulls the rider 48 along the circular track 46, which rotates around the vertical axis, the weight machine 230 provides the resistance for the movement of these components. As the user swings forward, the weight stack 234 moves in one direction along the predominantly vertical track and in the opposite direction when the user returns the sport or activity equipment back to the starting position. The operation of the apparatus of FIG. 4 is similar to that of FIG. 1a except insofar as the user first programs his or her desired perturbation type on the perturbation mechanism 242 before using the apparatus.

The operation of apparatus 320 of FIG. 5 is similar to that of FIG. 2a in that the user first sets his or her desired circular track 46 height and angle of tilt with the circular track height adjustment mechanisms 50, 320 and 326 before using the apparatus.

The operation of the apparatus of FIG. 6a is similar to that of FIG. 1a except insofar as the user first attaches the tethers and yokes 252 to the sport or activity equipment 38 and the rider 48 before using the apparatus. The operation of the apparatus of FIG. 6b is similar to that of FIG. 1a, except in that the user first programs the resistance-providing mechanism for the tether via a computerized control mechanism 90. The operation of the apparatus of FIG. 6c is similar to that of FIG. 1a except that the user first programs the circular track's lateral movement mechanism via a computerized control mechanism 90. The operation of the embodiment described in FIG. 6d is similar to that of FIG. 1a except that the user first programs the trajectory mechanism for rider 48 via computer 90.

The operation of the embodiment described in FIG. 7 is similar to that of FIG. 1a except that the user first programs the resistance function, which may be a varying resistance function, that will applied to the apparatus.

The operation of swing exercise apparatus 300 may be substantially the same as that of FIG. 1a, except that it applies to two objects moving at the same time, on left hand and right hand. The user may set the desired resistance on the resistance mechanism. Next, he or she adjusts the tethers to desired lengths and attaches them, respectively, to the two pieces of the sport or activity equipment 308 and 310. The user then stands, or otherwise takes an appropriate position or posture on the platform base 26 and holds one or both of the pieces of sport or activity equipment by the handles (additional components not shown). The user then attains the stance he or she will assume at the start of the swing or exercise. In this stance, the sport or activity equipment can start in any position in respect to the user's body. The user then starts the swing or exercise and moves the sport or activity equipment in the selected motion. This movement pulls the riders 304 and 306. The respective forces on the riders 304 and 306 are divided into two components. The first component pulls the riders along the circular tracks 42 and 302 and the second component pulls the circular tracks 42 and 302 around the vertical axis. The two components of motion give a circular trajectory to the riders 304 and 306 in 3D space. The user may choose to travel the entire trajectory or may return the sport or activity equipment back to their original position for movement, and may undertake however many repetitions.

The operation of apparatus 340 shown in FIG. 9 is similar to that of FIG. 1a except as described next. It differs in that the user has the option to swing and have the rider 48 follow along a fully circular track overhead track 344. Such a track may permit the practice of a swing corresponding to a tennis serve.

The operation of the different embodiments of apparatus may vary somewhat according to the type of sporting or other equipment shown in FIGS. 10 to 24. To operate these sport or exercise handles, one attaches one or more of them to one or more of the above apparatus. The user then grasps one or more of them on one or more of their components and then performs his or her desired swing or exercise.

Several embodiments have been described hereinabove. Further embodiments can be made combining the features and aspects of those embodiments in such combinations and permutations as may be appropriate, as may be understood without need for redundant explanation of further description of all of those possible combinations and permutations.

What has been described above has been intended illustrative and non-limiting and it will be understood by persons skilled in the art that other variances and modifications may be made without departing from the scope of the disclosure as defined in the claims appended hereto. Various embodiments of the invention have been described in detail. Since changes in and or additions to the above-described best mode may be made without departing from the nature, spirit or scope of the invention, the invention is not to be limited to those details but only by the appended claims.

We claim:

1. An arcuate motion apparatus comprising:
    an arcuately moveable carrier and a movable member; said movable member being mounted to said arcuately moveable carrier; said movable member having a tool engagement interface; an arcuate motion schedule;
    said motion member being constrained to move according to said arcuate motion schedule;
    said schedule includes a mechanical guide and said movable member is constrained to follow said guide;

said arcuately moveable carrier includes a first armature and a second armature;

said first armature has a first rotational degree of freedom relative to a stationary datum; said second armature has a second rotational degree of freedom relative to said first armature;

said second degree of freedom being perpendicular to said first degree of freedom; and said movable member is mounted to said second armature, whereby said movable member has first and second rotational degrees of freedom relative to the stationary datum.

2. The arcuate motion apparatus of claim 1 wherein said schedule is adjustable.

3. The arcuate motion apparatus of claim 1 wherein said schedule includes a substantially circular trackway.

4. The arcuate motion apparatus of claim 3 wherein said trackway has an angular adjustment by which to incline said trackway relative to horizontal.

5. The arcuate motion apparatus of claim 1 wherein said second armature is substantially circular.

6. The arcuate motion apparatus of claim 5 wherein said apparatus includes a drive mounted to govern motion of said movable member along said second armature.

7. The arcuate motion apparatus of claim 1 wherein said movable member is secured at a fixed location on said second armature, and said first and second armatures are driven to govern motion of said movable member according to said schedule.

8. The arcuate motion apparatus of claim 7 wherein said schedule is a virtual schedule, and said apparatus is programmed to drive motion of said movable member according to said schedule.

9. The arcuate motion apparatus of claim 1 wherein said apparatus includes sensing equipment operable to track motion of said movable member.

10. The arcuate motion apparatus of claim 1 wherein said movable member is governed by a drive, and said drive is force-limited.

11. The arcuate motion apparatus of claim 1 wherein said movable member is driven to follow said schedule, and said movable member has feedback in respect of at least one of (a) position; (b) velocity; and (c) force.

12. The arcuate motion apparatus of claim 1 wherein said apparatus has (a) a non-load sensing capability; (b) an end condition arcuate motion objective; and a comparator operable to determine the difference between (a) and (b).

13. The arcuate motion apparatus of claim 12 wherein said apparatus is programmed to interpolate between (a) and (b) to define partial regime adjustment steps, and to modify operation of said movable member along said schedule according to said adjustment steps.

14. The arcuate motion apparatus of claim 1 wherein said movable member is radially adjustable.

15. The arcuate motion apparatus of claim 1 wherein said apparatus includes a stationary base, and said apparatus has an origin of motion having an adjustable position relative to said stationary base.

16. An arcuate motion apparatus comprising:
an arcuately moveable carrier and a movable member;
said movable member being mounted to said arcuately moveable carrier;
said movable member having a tool engagement interface;
said arcuately moveable carrier includes a first armature:
said first armature has a first rotational degree of freedom relative to a stationary datum:
said movable member has a second degree of freedom of motion relative to said first armature;
said second degree of freedom being perpendicular to said first degree of freedom;
whereby said movable member has two degrees of freedom relative to the stationary datum.

17. The arcuate motion apparatus of claim 16 wherein said tool engagement interface is an accommodation defining one of (a) a female socket for receiving a corresponding male object; and (b) a male socket for receiving a corresponding female object.

18. The arcuate motion apparatus of claim 16 wherein said apparatus comprises an arcuate motion schedule: said movable member is constrained to move according to said arcuate motion schedule: and said schedule includes a mechanical guide and said movable member is constrained to follow said guide.

19. The arcuate motion apparatus of claim 16 wherein said arcuately moveable carrier has a drive, said drive being operable to encourage motion of said movable member according to said schedule.

20. The arcuate motion apparatus of claim 16 wherein said movable member is driven to follow said schedule, and said movable member has feedback in respect of at least one of (a) position; (b) velocity; and (c) force.

21. The arcuate motion apparatus of claim 16 wherein said second degree of freedom is a circumferential angular degree of freedom relative to said first armature.

22. The arcuate motion apparatus of claim 16 wherein said apparatus includes two said arcuately moveable carriers and two said movable members operable independently of each other.

* * * * *